United States Patent
Mori et al.

(10) Patent No.: US 9,780,712 B2
(45) Date of Patent: Oct. 3, 2017

(54) CONTROL APPARATUS FOR AC ROTARY MACHINE AND CONTROL APPARATUS FOR ELECTRIC POWER STEERING

(71) Applicant: Mitsubishi Electric Corporation, Tokyo (JP)

(72) Inventors: Tatsuya Mori, Tokyo (JP); Isao Kezobo, Tokyo (JP); Yoshihiko Kimpara, Tokyo (JP); Akira Furukawa, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/110,270

(22) PCT Filed: Feb. 21, 2014

(86) PCT No.: PCT/JP2014/054146
§ 371 (c)(1),
(2) Date: Jul. 7, 2016

(87) PCT Pub. No.: WO2015/125269
PCT Pub. Date: Aug. 27, 2015

(65) Prior Publication Data
US 2016/0329850 A1 Nov. 10, 2016

(51) Int. Cl.
*H02P 21/00* (2016.01)
*H02P 21/22* (2016.01)
(Continued)

(52) U.S. Cl.
CPC .......... *H02P 21/22* (2016.02); *B62D 5/0463* (2013.01); *H02P 27/08* (2013.01)

(58) Field of Classification Search
CPC .... B62D 5/0403; B62D 5/0463; H02K 21/16; H02P 2209/07; H02P 21/22; H02P 27/08; H02P 6/182
(Continued)

(56) References Cited

U.S. PATENT DOCUMENTS 5,982,067 A * 11/1999 Sebastian ............. B62D 5/0403
310/179
7,040,450 B2 * 5/2006 Nagase .................. B62D 5/046
180/443
(Continued)

FOREIGN PATENT DOCUMENTS

JP 3-230767 A 10/1991
JP 2012-50164 A 3/2012
(Continued)

OTHER PUBLICATIONS

International Search Report of PCT/JP2014/054146, dated May 20, 2014. [PCT/ISA/210].

*Primary Examiner* — Rita Leykin
(74) *Attorney, Agent, or Firm* — Sughrue Mion, PLLC; Richard C. Turner

(57) ABSTRACT

This invention is concerning a control apparatus for an AC rotary machine including: an AC rotary machine that includes a first winding and a second winding which have a phase difference; a first current detection unit that detects a current of the first winding; a second current detection unit that detects a current of the second winding; a control unit that calculates a first voltage command and a second voltage command on the basis of a detected current value; and a first detectability determination unit that determines a detectability of the current of the first winding, detected by the first current detection unit, on the basis of at least one of the voltage commands, wherein the control unit calculates the first voltage command and the second voltage command on the basis of the detected current value of the second winding when the current of the first winding is undetectable.

22 Claims, 31 Drawing Sheets

(51) Int. Cl.
*B62D 5/04* (2006.01)
*H02P 27/08* (2006.01)

(58) Field of Classification Search
USPC .................................. 318/490, 400.04, 724
See application file for complete search history.

(56) References Cited

U.S. PATENT DOCUMENTS

| | | | | |
|---|---|---|---|---|
| 7,459,879 | B2* | 12/2008 | Kezobo | B62D 5/046 |
| | | | | 318/727 |
| 8,604,730 | B2* | 12/2013 | Suzuki | H02M 1/14 |
| | | | | 318/400.02 |
| 8,963,462 | B2* | 2/2015 | Mori | H02P 6/16 |
| | | | | 318/400.01 |
| 8,981,687 | B2* | 3/2015 | Kuroda | H02P 27/06 |
| | | | | 318/400.02 |
| 8,981,704 | B2* | 3/2015 | Endo | B62D 5/046 |
| | | | | 318/400.01 |
| 9,214,886 | B2* | 12/2015 | Suzuki | H02P 21/12 |
| 9,331,623 | B2* | 5/2016 | Hirotani | B62D 5/046 |
| 9,344,019 | B2* | 5/2016 | Furukawa | B62D 5/0403 |
| 9,362,860 | B2* | 6/2016 | Sugawara | H02P 6/28 |
| 9,571,017 | B2* | 2/2017 | Hirotani | H02P 25/22 |
| 9,575,127 | B2* | 2/2017 | Kezobo | B62D 5/0487 |
| 2012/0049782 | A1 | 3/2012 | Suzuki | |

FOREIGN PATENT DOCUMENTS

| | | |
|---|---|---|
| JP | 2012-50252 A | 3/2012 |
| JP | 2013-207975 A | 10/2013 |

* cited by examiner

| Sup1 | Sun1 | Svp1 | Svn1 | Swp1 | Swn1 | FIRST VOLTAGE VECTOR | Idc1 |
|---|---|---|---|---|---|---|---|
| 0 | 1 | 0 | 1 | 0 | 1 | V0(1) | 0 |
| 1 | 0 | 0 | 1 | 0 | 1 | V1(1) | Iu1 |
| 1 | 0 | 1 | 0 | 0 | 1 | V2(1) | -Iw1 |
| 0 | 1 | 1 | 0 | 0 | 1 | V3(1) | Iv1 |
| 0 | 1 | 1 | 0 | 1 | 0 | V4(1) | -Iu1 |
| 0 | 1 | 0 | 1 | 1 | 0 | V5(1) | Iw1 |
| 1 | 0 | 0 | 1 | 1 | 0 | V6(1) | -Iv1 |
| 1 | 0 | 1 | 0 | 1 | 0 | V7(1) | 0 |

FIG. 3

| Sup2 | Sun2 | Svp2 | Svn2 | Swp2 | Swn2 | SECOND VOLTAGE VECTOR | Idc2 |
|---|---|---|---|---|---|---|---|
| 0 | 1 | 0 | 1 | 0 | 1 | V0(2) | 0 |
| 1 | 0 | 0 | 1 | 0 | 1 | V1(2) | Iu2 |
| 1 | 0 | 1 | 0 | 0 | 1 | V2(2) | −Iw2 |
| 0 | 1 | 1 | 0 | 0 | 1 | V3(2) | Iv2 |
| 0 | 1 | 1 | 0 | 1 | 0 | V4(2) | −Iu2 |
| 0 | 1 | 0 | 1 | 1 | 0 | V5(2) | Iw2 |
| 1 | 0 | 0 | 1 | 1 | 0 | V6(2) | −Iv2 |
| 1 | 0 | 1 | 0 | 1 | 0 | V7(2) | 0 |

FIG. 4

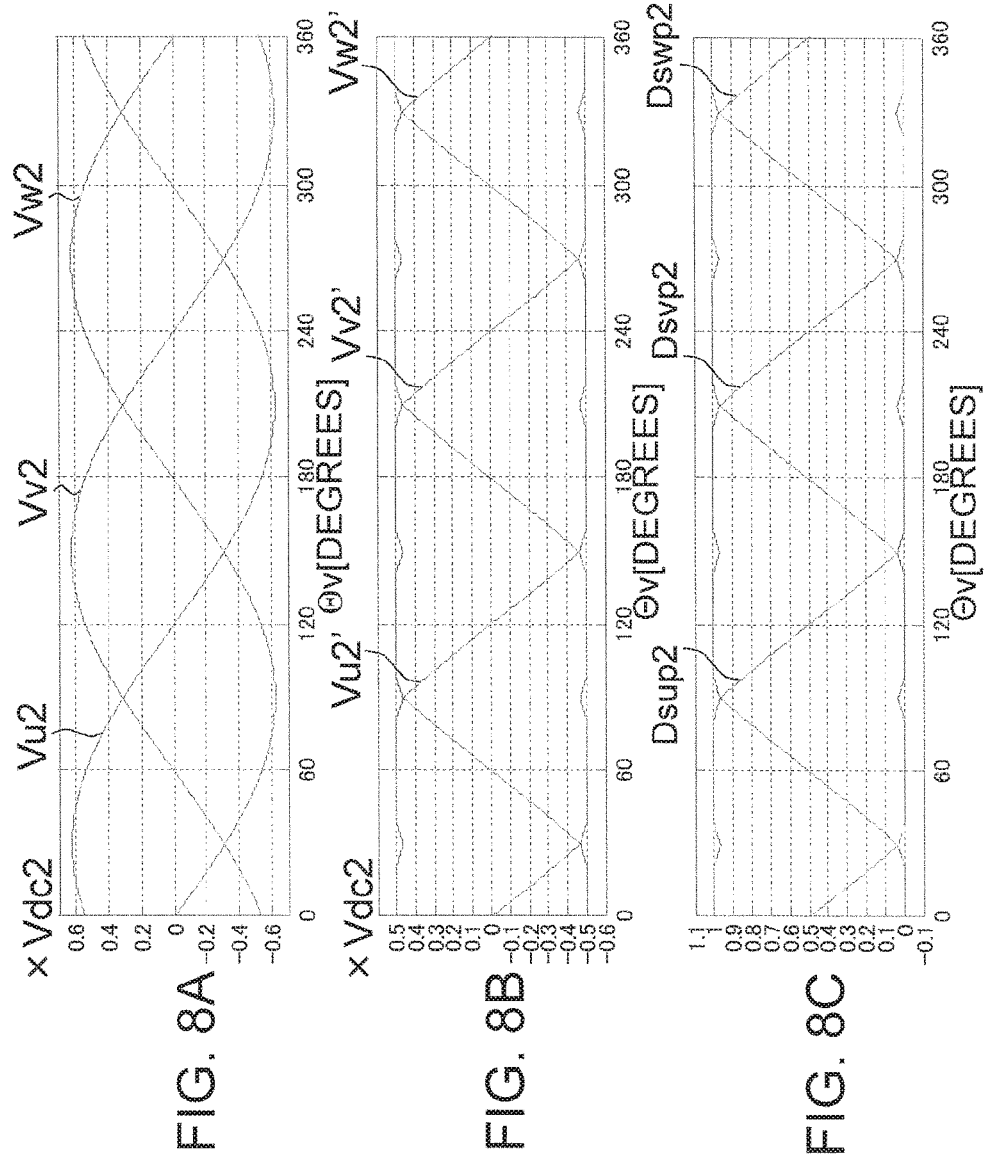

| Sup1 | Sun1 | Svp1 | Svn1 | Swp1 | Swn1 | FIRST VOLTAGE VECTOR | Iu1_s | Iv1_s | Iw1_s |
|---|---|---|---|---|---|---|---|---|---|
| 0 | 1 | 0 | 1 | 0 | 1 | V0(1) | -Iu1 | -Iv1 | -Iw1 |
| 1 | 0 | 0 | 1 | 0 | 1 | V1(1) | 0 | -Iv1 | -Iw1 |
| 1 | 0 | 1 | 0 | 0 | 1 | V2(1) | 0 | 0 | -Iw1 |
| 0 | 1 | 1 | 0 | 0 | 1 | V3(1) | -Iu1 | 0 | -Iw1 |
| 0 | 1 | 1 | 0 | 1 | 0 | V4(1) | -Iu1 | 0 | 0 |
| 0 | 1 | 0 | 1 | 1 | 0 | V5(1) | -Iu1 | -Iv1 | 0 |
| 1 | 0 | 0 | 1 | 1 | 0 | V6(1) | 0 | -Iv1 | 0 |
| 1 | 0 | 1 | 0 | 1 | 0 | V7(1) | 0 | 0 | 0 |

FIG. 18

| Sup2 | Sun2 | Svp2 | Svn2 | Swp2 | Swn2 | SECOND VOLTAGE VECTOR | Iu2_s | Iv2_s | Iw2_s |
|---|---|---|---|---|---|---|---|---|---|
| 0 | 1 | 0 | 1 | 0 | 1 | V0(2) | -Iu2 | -Iv2 | -Iw2 |
| 1 | 0 | 0 | 1 | 0 | 1 | V1(2) | 0 | -Iv2 | -Iw2 |
| 1 | 0 | 1 | 0 | 0 | 1 | V2(2) | 0 | 0 | -Iw2 |
| 0 | 1 | 1 | 0 | 0 | 1 | V3(2) | -Iu2 | 0 | -Iw2 |
| 0 | 1 | 1 | 0 | 1 | 0 | V4(2) | -Iu2 | 0 | 0 |
| 0 | 1 | 0 | 1 | 1 | 0 | V5(2) | -Iu2 | -Iv2 | 0 |
| 1 | 0 | 0 | 1 | 1 | 0 | V6(2) | 0 | -Iv2 | 0 |
| 1 | 0 | 1 | 0 | 1 | 0 | V7(2) | 0 | 0 | 0 |

FIG. 19

CONTROL APPARATUS FOR AC ROTARY MACHINE AND CONTROL APPARATUS FOR ELECTRIC POWER STEERING

CROSS REFERENCE TO RELATED APPLICATIONS

This application is a National Stage of International Application No. PCT/JP2014/054146 filed Feb. 21, 2014, the contents of all of which are incorporated herein by reference in their entirety.

TECHNICAL FIELD

This invention is a control apparatus for an AC rotary machine and a control apparatus for an electric power steering, with which an output of the AC rotary machine can be improved without the need to modify a control period.

BACKGROUND ART

In a phase current detection device of a conventional three-phase PWM inverter apparatus, a control period Tsw is varied in length in accordance with a phase command value θ* and a voltage command value V*. In an example disclosed in the prior art (see PTL 1, for example), when a holding time (t1 or t2) of a switching mode corresponding to a basic voltage vector other than a zero vector, the basic voltage vector being determined in accordance with the phase command value θ* and the voltage command value V*, is longer than a sum (tdd+tsw) of a dead time tdd of an inverter main circuit and a time tsw required for current detection by a hole CT9, a fixed short control period Tsw is selected. When the holding time of the switching mode is shorter than the time (tdd+tsw), on the other hand, the control period Tsw is lengthened so that the holding time is longer than the time (tdd+tsw).

CITATION LIST

Patent Literature

[PTL 1]
Japanese Patent Application Publication No. H3-230767

SUMMARY OF INVENTION

Technical Problem

However, the prior art contains the following problem. When the control period Tsw is lengthened, a PWM period (which is equal to the control period Tsw) output by the three-phase PWM inverter apparatus increases in length, leading to a reduction in a PWM frequency, which is given by the inverse of the PWM period. When an AC rotary machine is connected to the output of the three-phase PWM inverter, a component having the PWM frequency is included in a current flowing through the AC rotary machine. Therefore, when the PWM frequency decreases, the frequency of the component included in the current also decreases, with the result that noise is generated by the AC rotary machine.

In an AC rotary machine used in an electric power steering in particular, quietness is required, and therefore the PWM frequency is set to be no lower than 20 kHz (a frequency band exceeding an audible range), for example. Here, when a method of lengthening the control period Tsw (lowering the PWM frequency), such as that of PTL 1, is applied to an AC rotary machine used in an electric power steering, the PWM frequency falls below 20 kHz. As a result, noise is generated by the AC rotary machine, causing a person traveling in a vehicle installed with the electric power steering to experience discomfort.

This invention has been designed to solve the problem described above, and an object thereof is to provide a control apparatus for an AC rotary machine and a control apparatus for an electric power steering, with which an output of the AC rotary machine can be improved without the need to modify a control period.

Solution to Problem

A control apparatus for an AC rotary machine according to this invention includes: an AC rotary machine that includes a first winding and a second winding which have a phase difference; a first current detection unit that detects a current of the first winding; a second current detection unit that detects a current of the second winding; a control unit that calculates a first voltage command and a second voltage command on the basis of a detected current value of the AC rotary machine; a first voltage application unit that applies a voltage to the first winding on the basis of the first voltage command; a second voltage application unit that applies a voltage to the second winding on the basis of the second voltage command; and a first detectability determination unit that determines a detectability of the current of the first winding, detected by the first current detection unit, on the basis of at least one of the first voltage command and the second voltage command, wherein the control unit calculates the first voltage command on the basis of the current of the first winding, detected by the first current detection unit, when the first detectability determination unit determines that the current of the first winding is detectable, and calculates the first voltage command and the second voltage command on the basis of the current of the second winding, detected by the second current detection unit, when the first detectability determination unit determines that the current of the first winding is undetectable.

Further, a control apparatus for an electric power steering according to this invention includes the control apparatus for an AC rotary machine according to this invention, wherein the control unit calculates the first voltage command and the second voltage command such that the AC rotary machine generates torque for assisting steering torque of a steering system.

Advantageous Effects of Invention

According to this invention, when the first detectability determination unit determines that the current of the first winding is detectable, the first voltage command is calculated on the basis of the current of the first winding, detected by the first current detection unit, and when the first detectability determination unit determines that the current of the first winding is undetectable, the first voltage command and the second voltage command are calculated on the basis of the current of the second winding, detected by the second current detection unit. As a result, a striking effect not evident in the prior art, according to which the output of the AC rotary machine can be increased while reducing noise generated by the AC rotary machine, is obtained.

BRIEF DESCRIPTION OF DRAWINGS

FIG. 3 is a view showing relationships between a first voltage vector corresponding to ON/OFF conditions of respective semiconductor switches and a current flowing through a DC bus line of a first voltage application unit, according to the first embodiment of this invention.

FIG. 4 is a view showing a relationship between a second voltage vector corresponding to the ON/OFF conditions of the respective semiconductor switches and a current flowing through a DC bus line of a second voltage application unit, according to the first embodiment of this invention.

FIGS. 8A, 8B and 8C are views illustrating relationships between the voltage commands and the ON ratios of the upper side arm elements of the respective phases with respect to the second voltage application unit, according to the first embodiment of this invention.

FIG. 18 is a view showing a relationship between the first voltage vector corresponding to the ON/OFF conditions of the respective semiconductor switches and the currents of the first windings, according to the fifth embodiment of this invention.

FIG. 19 is a view showing a relationship between the second voltage vector corresponding to the ON/OFF conditions of the respective semiconductor switches and the currents of the second windings, according to the fifth embodiment of this invention.

DESCRIPTION OF EMBODIMENTS

Preferred embodiments of a control apparatus for an AC rotary machine and a control apparatus for an electric power steering according to this invention will be described below using the drawings.

First Embodiment

Figure 1:
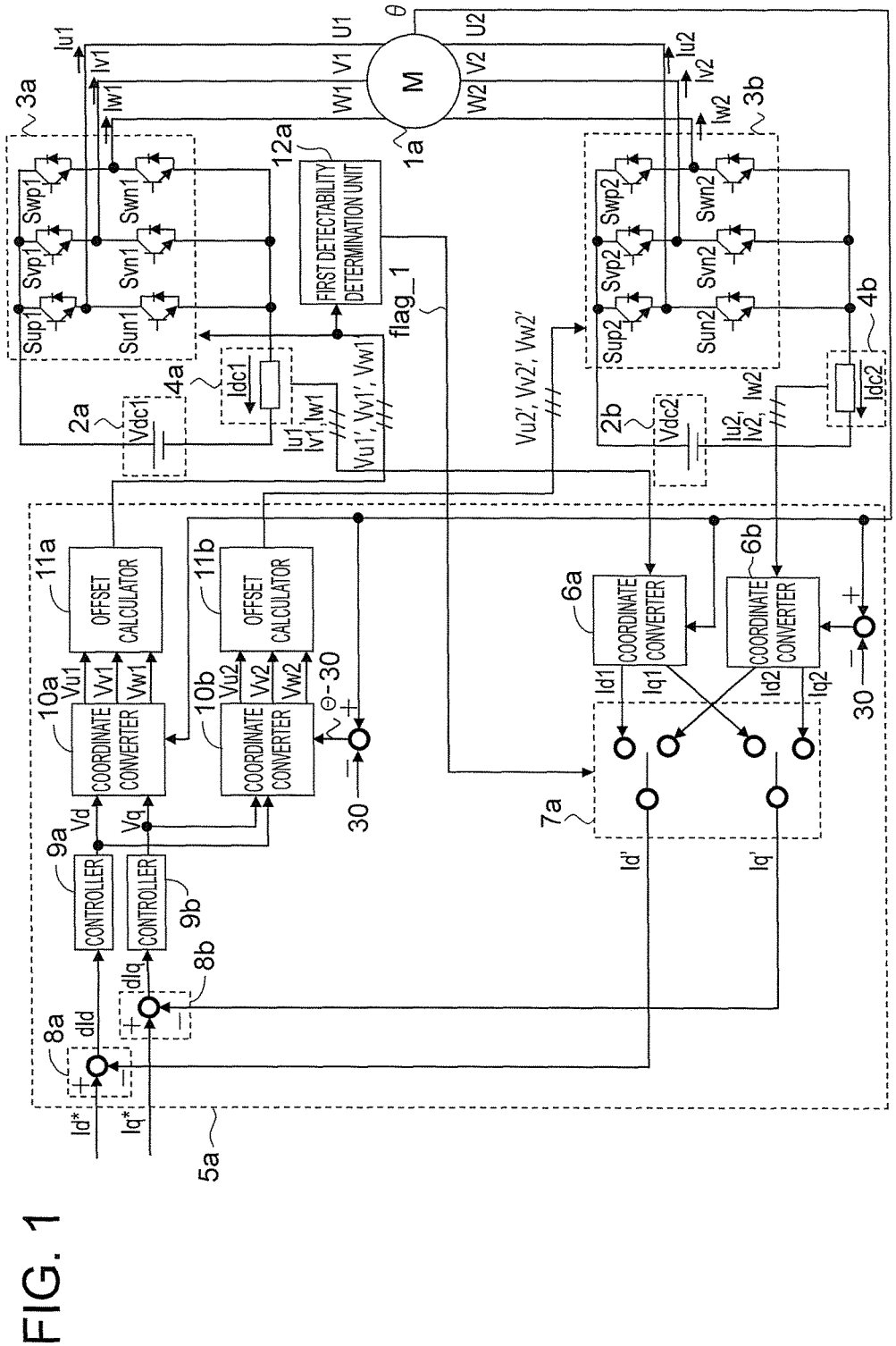
FIG. 1 is a view showing an overall configuration of a control apparatus for an AC rotary machine according to a first embodiment of this invention.
Figure 2:
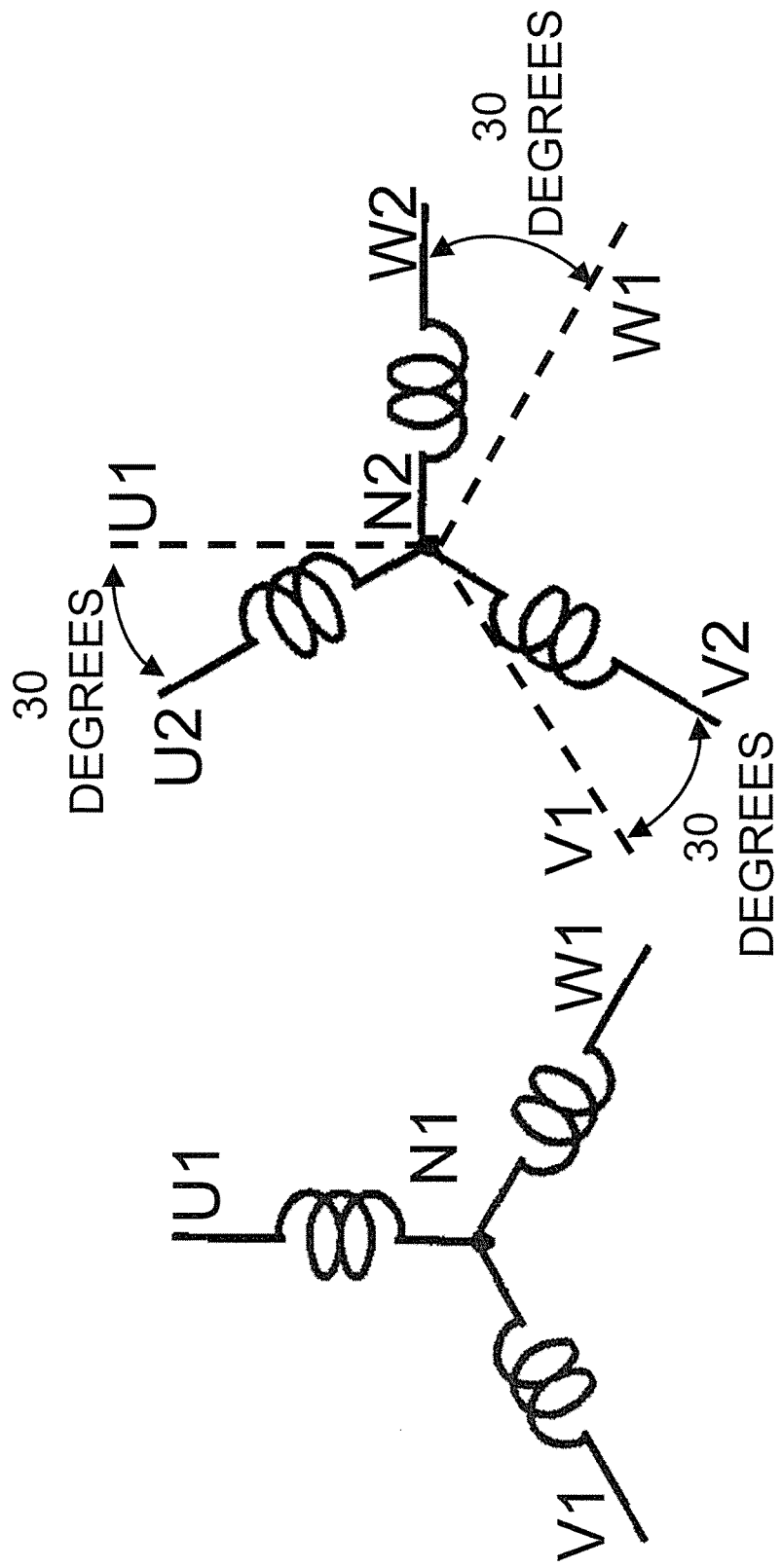
FIG. 2 is a view illustrating a configuration of a three-phase AC rotary machine used as an example of the AC rotary machine according to the first embodiment of this invention.

FIG. 1 is a view showing an overall configuration of a control apparatus for an AC rotary machine according to a first embodiment of this invention. Further, FIG. 2 is a view illustrating a configuration of a three-phase AC rotary machine used as an example of the AC rotary machine according to the first embodiment of this invention. As shown in FIG. 2, an AC rotary machine 1a shown in FIG. 1 is a three-phase AC rotary machine in which first three-phase windings U1, V1, W1 connected at a neutral point N1 and second three-phase windings U2, V2, W2 connected at a neutral point N2 are housed in a stator of a rotary machine without being electrically connected to each other.

Note that 30 degree phase differences exist respectively between the U1 winding and the U2 winding, the V1 winding and the V2 winding, and the W1 winding and the W2 winding. FIG. 2 shows a case in which the first three-phase windings and the second three-phase windings forming the AC rotary machine 1a are respectively Y-connected. However, this invention may also be applied to a case in which the windings are Δ-connected.

A DC power supply 2a outputs a DC voltage Vdc1 to a first voltage application unit 3a, and a DC power supply 2b outputs a DC voltage Vdc2 to a second voltage application unit 3b. The DC power supplies 2a, 2b include any device that outputs a DC voltage, such as a battery, a DC-DC converter, a diode rectifier, or a PWM rectifier. Further, a configuration in which a DC voltage is output to the first voltage application unit 3a and the second voltage application unit 3b using either one of the DC power supplies 2a, 2b is also included in the scope of this invention.

The first voltage application unit 3a performs PWM on first voltage commands Vu1', Vv1', Vw1' and switches semiconductor switches Sup1, Sun1, Svp1, Svn1, Swp1, Swn1 (in the following description, these six semiconductor switches will be referred to as the semiconductor switches Sup1 to Swn1) ON and OFF using an inverter circuit (an inverter). Thus, the first voltage application unit 3a converts the DC voltage Vdc1 input from the DC power supply 2a into an alternating current and applies an AC voltage to the first three-phase windings U1, V1, W1 of the AC rotary machine 1a. Here, switches formed by connecting a semiconductor switch such as an IGBT, a bipolar transistor, or a MOS power transistor to a diode in anti-parallel are used as the semiconductor switches Sup1 to Swn1.

The second voltage application unit 3b performs PWM on second voltage commands Vu2', Vv2', Vw2' and switches semiconductor switches Sup2, Sun2, Svp2, Svn2, Swp2, Swn2 (in the following description, these six semiconductor switches will be referred to as the semiconductor switches Sup2 to Swn2) ON and OFF using an inverter circuit (an inverter). Thus, the second voltage application unit 3b converts the DC voltage Vdc2 input from the DC power supply 2b into an alternating current and applies an AC voltage to the second three-phase windings U2, V2, W2 of the AC rotary machine 1a. Here, switches formed by connecting a semiconductor switch such as an IGBT, a bipolar transistor, or a MOS power transistor to a diode in anti-parallel are used as the semiconductor switches Sup2 to Swn2.

A first current detection unit 4a detects a current Idc1 flowing through a DC bus line of the first voltage application unit 3a using a current sensor such as a shunt resistor or a current transformer (CT). FIG. 3 is a view showing relationships between a first voltage vector V0 (1) to V7 (1) corresponding to the ON/OFF conditions of the semiconductor switches Sup1 to Swn1 and the current Idc1 flowing through the DC bus line of the first voltage application unit 3a, according to the first embodiment of this invention. Note that with respect to Sup1 to Swn1 in FIG. 3, "1" and "0" respectively indicate a condition in which the switch is ON and a condition in which the switch is OFF.

The first current detection unit 4a detects currents Iu1, Iv1, Iw1 of the first windings on the basis of the relationships shown in FIG. 3. Note that the first current detection unit 4a may detect two of the currents Iu1, Iv1, Iw1 of the first windings from Idc1, and determine the remaining current by calculation using the fact that the sum of the currents of the three phases is zero.

A second current detection unit 4b detects a current Idc2 flowing through a DC bus line of the second voltage application unit 3b using a current sensor such as a shunt resistor or a current transformer (CT). FIG. 4 is a view showing relationships between a second voltage vector V0 (2) to V7 (2) corresponding to the ON/OFF conditions of the semiconductor switches Sup2 to Swn2 and the current Idc2 flowing through the DC bus line of the second voltage application unit 3b, according to the first embodiment of this invention. Note that with respect to Sup2 to Swn2 in FIG. 4, "1" and "0" respectively indicate a condition in which the switch is ON and a condition in which the switch is OFF.

The second current detection unit 4b detects currents Iu2, Iv2, Iw2 of the second windings on the basis of the relationships shown in FIG. 4. Note that the second current detection unit 4b may detect two of the currents Iu2, Iv2, Iw2 of the second windings from Idc2, and determine the remaining current by calculation using the fact that the sum of the currents of the three phases is zero.

Further, the numeral (1) in parentheses in the first voltage vector shown in FIG. 3 and the numeral (2) in parentheses in the second voltage vector shown in FIG. 4 are provided to differentiate between the first voltage vector and the second voltage vector. Hence, (1) is appended to the first voltage vector based on the first voltage commands, and (2) is appended to the second voltage vector based on the second voltage commands.

A first detectability determination unit 12a determines whether or not the currents of the first windings can be detected on the basis of the first voltage commands Vu1', Vv1', Vw1', and outputs a first detectability determination signal flag_1.

Next, a control unit 5a will be described. A coordinate converter 6a calculates currents Id1, Iq1 of the first windings on two rotational axes by converting the currents Iu1, Iv1, Iw1 of the first windings, detected by the first current detection unit 4a, into currents on rotating coordinates on the basis of a rotation position θ of the AC rotary machine 1a.

A coordinate converter 6b calculates currents Id2, Iq2 of the second windings on two rotational axes by converting the currents Iu2, Iv2, Iw2 of the second windings, detected by the second current detection unit 4b, into currents on rotating coordinates on the basis of the rotation position θ of the AC rotary machine 1a.

When the currents of the first windings are determined to be detectable on the basis of the first detectability determination signal flag_1, a switch 7a is switched so that the currents Id1, Iq1 of the first windings are output respectively as currents Id', Iq' on rotating biaxial coordinates. Further, when the currents of the first windings are determined to be undetectable on the basis of the first detectability determination signal flag_1, the switch 7a is switched so that the currents Id, Iq of the second windings are output respectively as currents Id', Iq' on rotating biaxial coordinates.

A subtractor 8a calculates a deviation dId between a d axis current command Id* of the AC rotary machine 1a and the current Id' on rotating biaxial coordinates output by the switch 7a. Further, a subtractor 8b calculates a deviation dIq between a q axis current command Iq* of the AC rotary machine 1a and the current Iq' on rotating biaxial coordinates output by the switch 7a.

A controller 9a calculates a voltage command Vd on rotating biaxial coordinates using a P controller and a PI controller so that the deviation dId is controlled to zero. Further, a controller 9b calculates a voltage command Vq on rotating biaxial coordinates using a P controller and a PI controller so that the deviation dIq is controlled to zero.

A coordinate converter 10*a* calculates first voltage commands Vu1, Vv1, Vw1 by performing coordinate conversion to convert the voltage commands Vd, Vq on rotating biaxial coordinates into three-phase AC coordinates on the basis of the rotation position θ of the AC rotary machine 1*a*.

Further, a coordinate converter 10*b* calculates second voltage commands Vu2, Vv2, Vw2 by performing coordinate conversion to convert the voltage commands Vd, Vq on rotating biaxial coordinates into three-phase AC coordinates on the basis of a position θ−30, which is obtained by subtracting 30 degrees from the rotation position θ of the AC rotary machine 1*a*.

An offset calculator 11*a* adds an offset voltage Voffset1 to the first voltage commands Vu1, Vv1, Vw1, as shown below in Equations (1) to (3), and outputs the results as the first voltage commands Vu1', Vv1', Vw1'.

$$Vu1' = Vu1 + Voffset1 \quad (1)$$

$$Vv1' = Vv1 + Voffset1 \quad (2)$$

$$Vw1' = Vw1 + Voffset1 \quad (3)$$

An offset calculator 11*b* adds an offset voltage Voffset2 to the second voltage commands Vu2, Vv2, Vw2, as shown below in Equations (4) to (6), and outputs the results as the second voltage commands Vu2', Vv2', Vw2'.

$$Vu2' = Vu2 + Voffset2 \quad (4)$$

$$Vv2' = Vv2 + Voffset2 \quad (5)$$

$$Vw2' = Vw2 + Voffset2 \quad (6)$$

The first detectability determination unit 12*a* outputs the first detectability determination signal flag_1 on the basis of the first voltage commands Vu1', Vv1', Vw1'.

Figure 5:
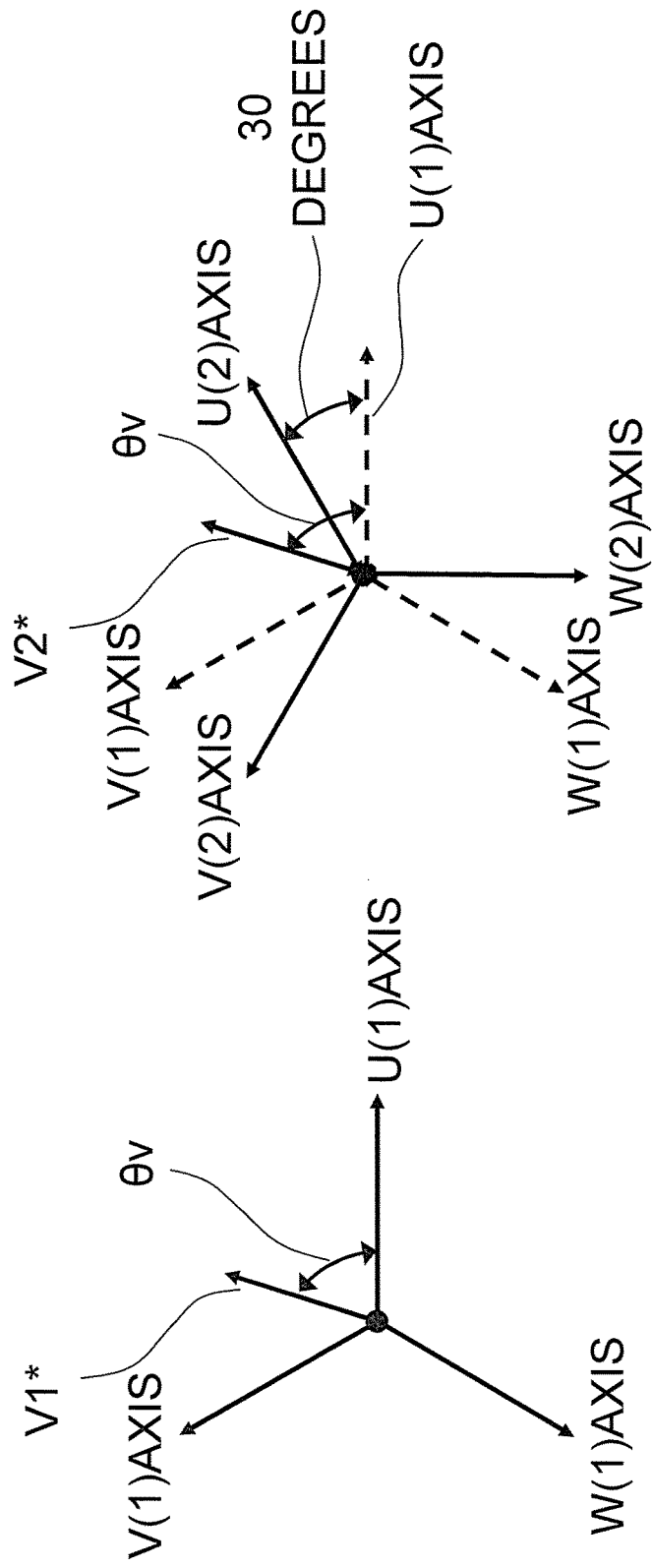
FIG. 5 is an illustrative view showing a first voltage command vector based on first voltage commands and a second voltage command vector based on second voltage commands, according to the first embodiment of this invention.

Next, the first and second voltage commands and operations performed by the first detectability determination unit 12*a* will be described in detail. FIG. 5 is an illustrative view showing a first voltage command vector V1* based on the first voltage commands Vu1', Vv1', Vw1' and a second voltage command vector V2* based on the second voltage commands Vu2', Vv2', Vw2', according to the first embodiment of this invention. As shown in FIG. 5, the first voltage command vector V1* and the second voltage command vector V2* are vectors that rotate about a U (1)–V (1)–W (1) axis and a U (2)–V (2)–W (2) axis, respectively.

Note that numerals shown in parentheses in FIG. 5 denote either axes corresponding to the first windings or axes corresponding to the second windings. More specifically, U (1), V (1), W (1), to which (1) is appended, respectively denote axes corresponding to the U phase, the V phase, and the W phase of the first windings, while U (2), V (2), W (2), to which (2) is appended, respectively denote axes corresponding to the U phase, the V phase, and the W phase of the second windings. Here, phase angles of the first voltage command vector V1* and the second voltage command vector V2* when the U (1) axis is used as a reference are both θv. In other words, there is no phase difference therebetween.

Figure 6:
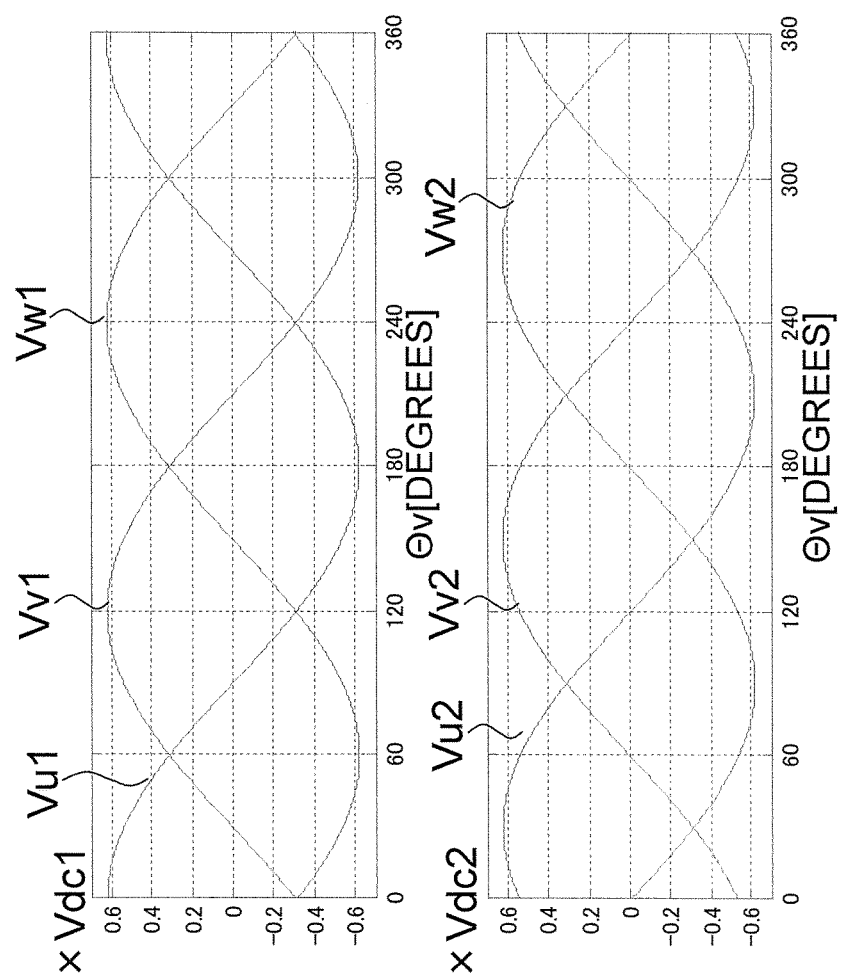
FIG. 6 is a waveform diagram showing the first voltage commands and the second voltage commands according to the first embodiment of this invention.

FIG. 6 is a waveform diagram showing the first voltage commands Vu1, Vv1, Vw1 and the second voltage commands Vu2, Vv2, Vw2 according to the first embodiment of this invention. The U (2), V (2), and W (2) axes shown in FIG. 5 are respectively retarded by a phase of 30 degrees relative to the U (1), V (1), and W (1) axes. Therefore, as shown in FIG. 6, the second voltage commands Vu2, Vv2, Vw2 are respectively retarded by a phase of 30 degrees relative to the first voltage commands Vu1, Vv1, Vw1.

In FIG. 6, the abscissa shows the voltage phase angle θv when the U (1) axis is used as a reference. Hence, with respect to the AC rotary machine 1*a*, in which a 30 degree phase difference exists between the first windings and the second windings, a 30 degree phase difference exists between the first voltage commands and the second voltage commands. Similarly, with respect to an AC rotary machine in which a phase difference of 30+60×N (where N is an integer) exists between the first windings and the second windings, a 30+60×N degree phase difference exists between the first voltage commands and the second voltage commands.

Figures 7A, 7B, 7C:
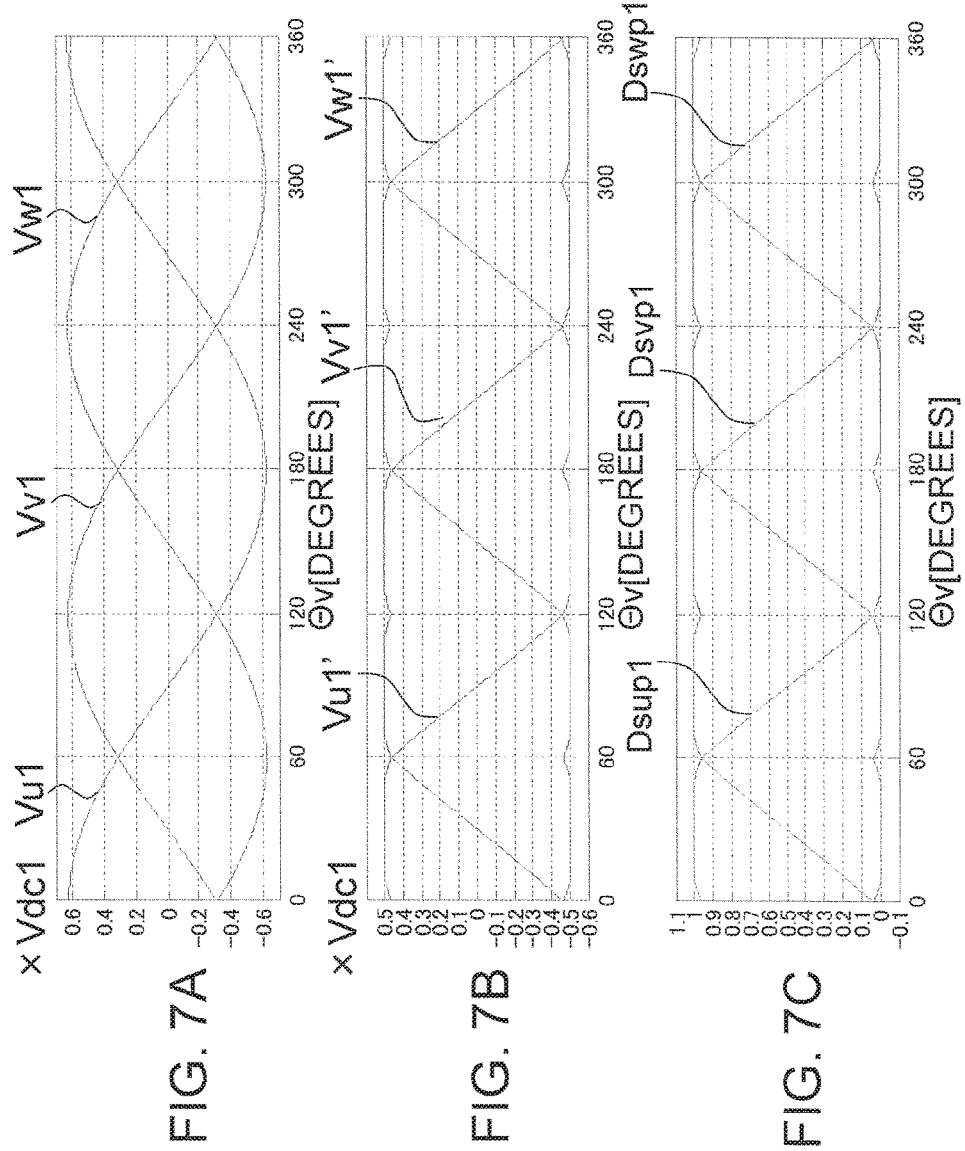
FIGS. 7A, 7B and 7C are views illustrating relationships between the voltage commands and ON ratios of upper side arm elements of respective phases with respect to the first voltage application unit, according to the first embodiment of this invention.

FIGS. 7A, 7B and 7C are views illustrating relationships between the voltage commands and ON ratios of upper side arm elements of the respective phases with respect to the first voltage application unit 3*a*, according to the first embodiment of this invention. FIG. 7A shows the first voltage commands Vu1, Vv1, Vw1 shown in FIG. 6, which serve as the output of the coordinate converter 10*a*. FIG. 7B shows the first voltage commands Vu1', Vv1', Vw1' serving as the output of the offset calculator 11*a*, which are calculated using Equations (1) to (3).

The offset voltage Voffset1 of Equations (1) to (3) is given by Equation (7), shown below, using a maximum value Vmax1 and a minimum value Vmin1 of the first voltage commands Vu1, Vv1, Vw1.

$$Voffset1 = -0.5(Vmin1 + Vmax1) \quad (7)$$

Note, however, that a voltage output range of a phase voltage that can be output by the first voltage application unit 3*a* extends from zero to the bus line voltage Vdc1. Therefore, when the first voltage commands Vu1', Vv1', Vw1' are smaller than −0.5 Vdc1 or exceed 0.5 Vdc1, the first voltage commands Vu1', Vv1', Vw1' are limited to −0.5 Vdc1 or 0.5 Vdc1 so as to remain within the voltage Vdc1 that can be output by the first voltage application unit 3*a*.

Further, Voffset1 may be determined using another known offset voltage calculation method such as a two phase modulation method or a third harmonic wave superimposing method instead of Equation (7).

FIG. 7C shows ON duties Dsup1, Dsvp1, Dswp1 denoting ON ratios of the upper side arm elements (Sup1, Svp1, Swp1) of the respective phases of the first voltage application unit 3*a*. These ON duties Dsup1, Dsvp1, Dswp1 are determined from $$Dsxp1 = 0.5 + Vx1'/Vdc1$$

using Vu1', Vv1', Vw1', respectively. Here, x=U, V, W. When Dsup1 is 0.6, for example, the first voltage application unit 3*a* sets the ON ratio of Sup1 within a switching period Tsw at 0.6.

In the first voltage application unit 3*a*, either the upper side arm elements (Sup1, Svp1, Swp1) or lower side arm elements (Sun1, Svn1, Swn1) are switched ON at all times in each phase. Accordingly, relationships shown below in Equations (8) to (10) are established between the ON duties (Dsup1, Dsvp1, Dswp1) of the upper side arm elements of the respective phases and ON duties (Dsun1, Dsvn1, Dswn1) of the lower side arm elements.

$$Dsup1 + Dsun1 = 1 \quad (8)$$

$$Dsvp1 + Dsvn1 = 1 \quad (9)$$

$$Dswp1 + Dswn1 = 1 \quad (10)$$

Therefore, in accordance with Equation (8), when Dsup1 is 0.6, for example, Dsun1 is 0.4. Thus, the ON duties of the respective switching elements in the first voltage application unit 3a are determined on the basis of the first voltage commands Vu1', Vv1', Vw1'.

FIGS. 8A, 8B and 8C are views illustrating relationships between the voltage commands and the ON ratios of the upper side arm elements of the respective phases with respect to the second voltage application unit 3b, according to the first embodiment of this invention. FIG. 8A shows the second voltage commands Vu2, Vv2, Vw2 shown in FIG. 6, which serve as the output of the coordinate converter 10b. FIG. 8B shows the second voltage commands Vu2', Vv2', Vw2' serving as the output of the offset calculator 11b, which are calculated using Equations (4) to (6).

The offset voltage Voffset2 of Equations (4) to (6) is given by Equation (11), shown below, using a maximum value Vmax2 and a minimum value Vmin2 of the second voltage commands Vu2, Vv2, Vw2.

$$Voffset2=-0.5(Vmin2+Vmax2) \quad (11)$$

Note, however, that the voltage output range of the phase voltage that can be output by the second voltage application unit 3b extends from zero to the bus line voltage Vdc2. Therefore, when the second voltage commands Vu2', Vv2', Vw2' are smaller than −0.5 Vdc2 or exceed 0.5 Vdc2, the second voltage commands Vu2', Vv2', Vw2' are limited to −0.5 Vdc2 or 0.5 Vdc2 so as to remain within the voltage Vdc2 that can be output by the second voltage application unit 3b.

Further, Voffset2 may be determined using another known offset voltage calculation method such as a two phase modulation method or a third harmonic wave superimposing method instead of Equation (11).

FIG. 8C shows ON duties Dsup2, Dsvp2, Dswp2 denoting ON ratios of the upper side arm elements (Sup2, Svp2, Swp2) of the respective phases of the second voltage application unit 3b. These ON duties Dsup2, Dsvp2, Dswp2 are determined from $$Dsxp2=0.5+Vx2'/Vdc2$$

using Vu2', Vv2', Vw2', respectively. Here, x=U, V, W. When Dsup2 is 0.6, for example, the second voltage application unit 3b sets the ON ratio of Sup2 within the switching period Tsw at 0.6.

In the second voltage application unit 3b, either the upper side arm elements (Sup2, Svp2, Swp2) or lower side arm elements (Sun2, Svn2, Swn2) are switched ON at all times in each phase. Accordingly, relationships shown below in Equations (12) to (14) are established between the ON duties (Dsup2, Dsvp2, Dswp2) of the upper side arm elements of the respective phases and ON duties (Dsun2, Dsvn2, Dswn2) of the lower side arm elements.

$$Dsup2+Dsun2=1 \quad (12)$$

$$Dsvp2+Dsvn2=1 \quad (13)$$

$$Dswp2+Dswn2=1 \quad (14)$$

Therefore, in accordance with Equation (12), when Dsup2 is 0.6, for example, Dsun2 is 0.4. Thus, the ON duties of the respective switching elements in the second voltage application unit 3b are determined on the basis of the second voltage commands Vu2', Vv2', Vw2'.

Figure 9:
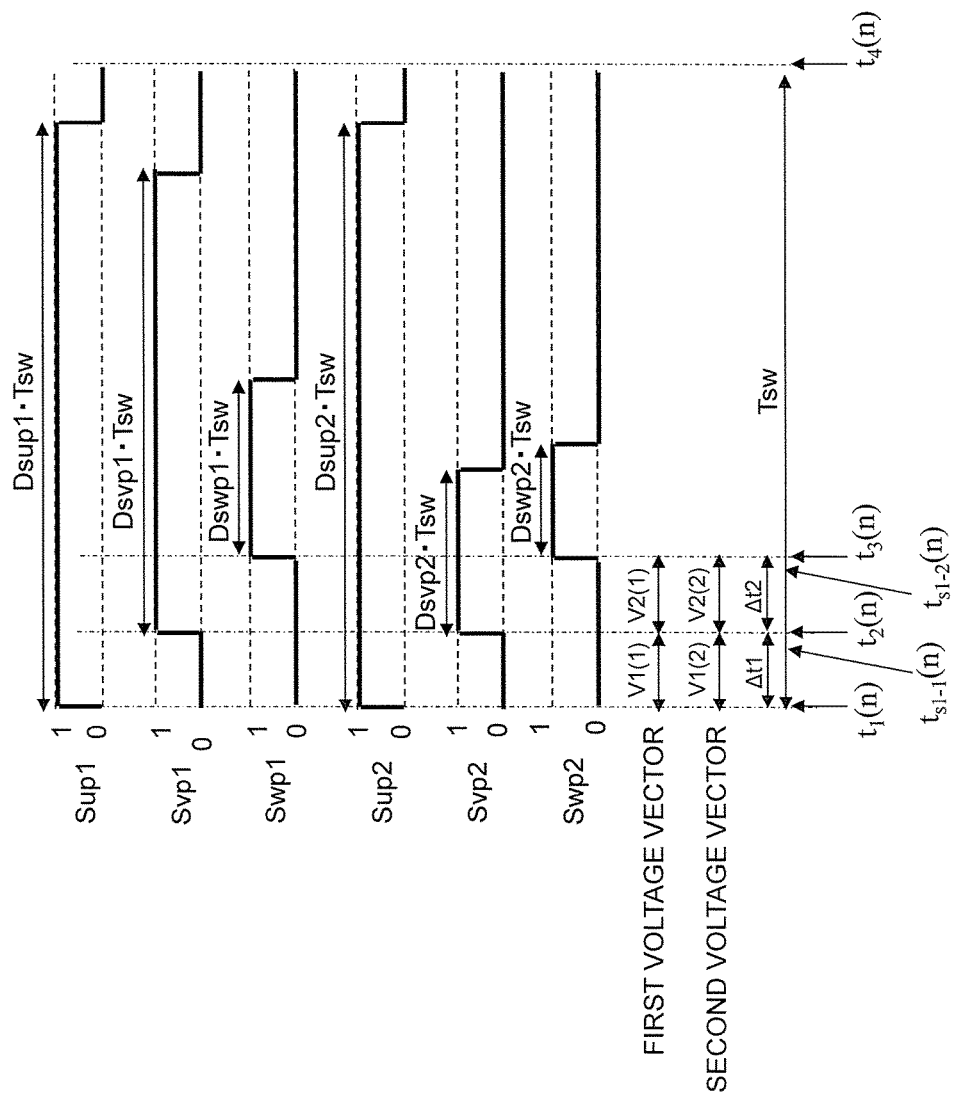
FIG. 9 is a view illustrating operations relating to ON/OFF patterns of the semiconductor switches and a period of a switching signal in current detection units, according to the first embodiment of this invention.

FIG. 9 is a view illustrating operations relating to ON/OFF patterns of the semiconductor switches and a period of a switching signal in the current detection units, according to the first embodiment of this invention. More specifically, FIG. 9 is a view showing a relationship between ON/OFF patterns of the semiconductor switches Sup1, Svp1, Swp1 of the first voltage application unit 3a and the semiconductor switches Sup2, Svp2, Swp2 of the second voltage application unit 3b and the period Tsw of the switching signal in the first current detection unit 4a and the second current detection unit 4b.

Note that Sun1, Svn1, Swn1, Sun2, Svn2, Swn2 have inverse relationships to Sup1, Svp1, Swp1, Sup2, Svp2, Swp2, respectively (i.e. 0 in place of 1 and 1 in place of 0, excluding a dead time period), and are not therefore described.

In FIG. 9, when a first maximum phase voltage Emax1, a first intermediate phase voltage Emid1, and a first minimum phase voltage Emin1 are set in descending order in relation to the first voltage commands Vu1', Vv1', Vw1', relationships shown below in Equations (15) to (17) are assumed to be established.

$$Emax1=Vu1' \quad (15)$$

$$Emid1=Vv1' \quad (16)$$

$$Emin1=Vw1' \quad (17)$$

Similarly, when a second maximum phase voltage Emax2, a second intermediate phase voltage Emid2, and a second minimum phase voltage Emin2 are set in descending order in relation to the second voltage commands Vu2', Vv2', Vw2', relationships shown below in Equations (18) to (20) are assumed to be established.

$$Emax2=Vu1' \quad (18)$$

$$Emid2=Vv1' \quad (19)$$

$$Emin2=Vw1' \quad (20)$$

At a time t1 (n), Sup1 and Sup2 are set at 1 and Svp1, Swp1, Svp2, and Swp2 are set at 0, whereupon this condition is maintained until a time t2 (n) arrives following the elapse of Δt1. In accordance with FIGS. 3 and 4, the first voltage vector and the second voltage vector are at V1 (1) and V1 (2), respectively, between the times t1 (n) and t2 (n). Idc1 is detected at a time ts1-1 (n) between the times t1 (n) and t2 (n).

The time shift Δt1 is set to be longer than a sum of a dead time of the first voltage application unit 3a and the second voltage application unit 3b and a time required for the first current detection unit 4a to detect Idc1 or for the second current detection unit 4b to detect Idc2 (for example, a time required for ringing included in a detected waveform to converge and a sample holding time). For example, Δt1=5 μs.

In accordance with FIG. 3, the first voltage vector is at V1 (1) between the times t1 (n) and t2 (n), and therefore Idc1 is equal to Iu1 when detected at the time ts1-1 (n). Further, in accordance with FIG. 4, the second voltage vector is at V1 (2) between the times t1 (n) and t2 (n), and therefore Idc2 is equal to Iu2 when detected at the time ts1-1 (n).

Next, at the time t2 (n), Svp1 and Svp2 are set at 1, and this switching pattern is maintained until a time t3 (n). In accordance with FIGS. 3 and 4, the first voltage vector and the second voltage vector are at V2 (1) and V2 (2), respectively, between the times t2 (n) and t3 (n).

At a time ts1-2 (n), Idc1 and Idc2 are detected again. A time shift Δt2, similarly to the time shift Δt1, is set to be longer than the sum of the dead time of the first voltage application unit 3a and the second voltage application unit 3b and the time required for the first current detection unit 4a to detect Idc1 or for the second current detection unit 4b to detect Idc2. Typically, Δt1=Δt2.

In accordance with FIG. 3, the first voltage vector is at V2 (1) between the times t2 (n) and t3 (n), and therefore Idc1 is equal to −Iw1 when detected at the time ts1-2 (n). Further, in accordance with FIG. 4, the second voltage vector is at V2 (2) between the times t2 (n) and t3 (n), and therefore Idc2 is equal to −Iw2 when detected at the time ts1-2 (n).

The currents Iu1, Iw1 of the first windings and the currents Iu2, Iw2 of the second windings can be detected in the manner described above, and therefore the currents Iu1, Iv1 (=−Iu1−Iw1), Iw1 of the first windings and the currents Iu2, Iv2 (=−Iu2−Iw2), Iw2 of the second windings can be detected using the fact that the sum of the currents of the three phases is zero.

At a time t3 (n), Swp1 and Swp2 are set at 1. A pulse width (a time during which "1" is maintained) between Sup1 and Swp2 is determined from a product of the ON duties Dsup1 to Dswp2 corresponding to the respective switches and the switching period Tsw.

In the first embodiment, as described above, the switch of the upper side arm element of the phase corresponding to the first maximum phase voltage Emax1, the switch of the upper side arm element of the phase corresponding to the first intermediate phase voltage Emid1, and the switch of the upper side arm element of the phase corresponding to the first minimum phase voltage Emin1 are switched ON in that order at the time shifts Δt1 and Δt2. By performing switching in this manner, the two types of first voltage vectors shown in FIG. 3, with which two of the currents Iu1, Iv1, Iw1 of the first windings can be detected from Idc1, are formed and the two types of second voltage vectors shown in FIG. 4, with which two of the currents Iu2, Iv2, Iw2 of the second windings can be detected from Idc2, are formed.

Depending on the voltage command value of the phase corresponding to the first intermediate phase voltage Emid1, however, it may be impossible to form the two types of first voltage vectors with which two of the currents Iu1, Iv1, Iw1 of the first windings can be detected from Idc1, and as a result, it may be impossible to detect the currents Iu1, Iv1, Iw1 of the first windings.

Figure 10:
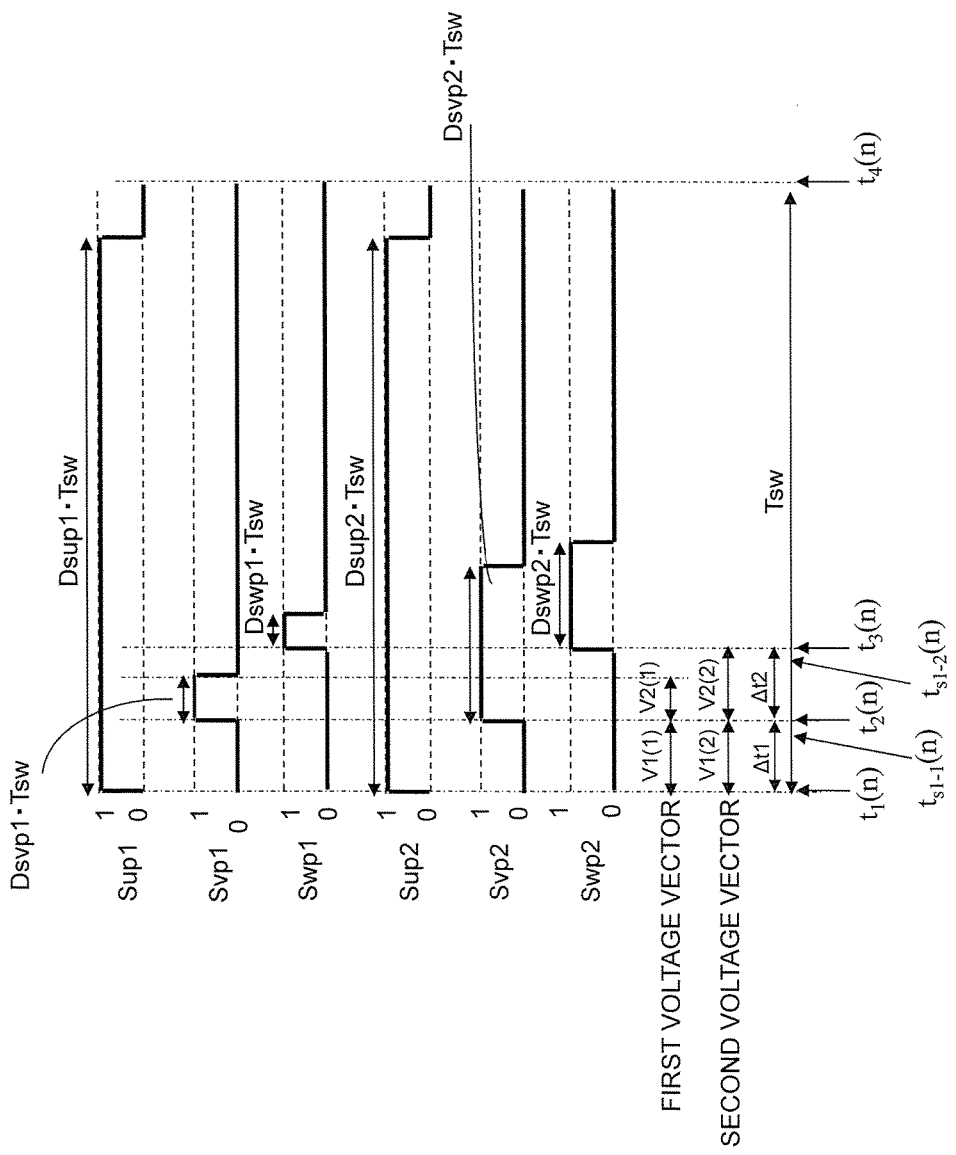
FIG. 10 is a view illustrating different operations to those of FIG. 9 relating to the ON/OFF patterns of the semiconductor switches and the period of the switching signal in the current detection units, according to the first embodiment of this invention.

FIG. 10 is a view illustrating different operations to those of FIG. 9 relating to the ON/OFF patterns of the semiconductor switches and the period of the switching signal in the current detection units, according to the first embodiment of this invention, FIG. 10 showing an example of a case in which the currents Iu1, Iv1, Iw1 of the first windings cannot be detected. FIG. 10 shows a condition in which Vv1' is small such that Dsvp1×Tsw is smaller than Δt2. When Svp1 is switched ON at the time t2 (n) in this condition, Svp1 is switched OFF before the time t3 (n) arrives, and therefore the first voltage vector V2 (1) cannot be formed within the time shift Δt2.

Figure 11:
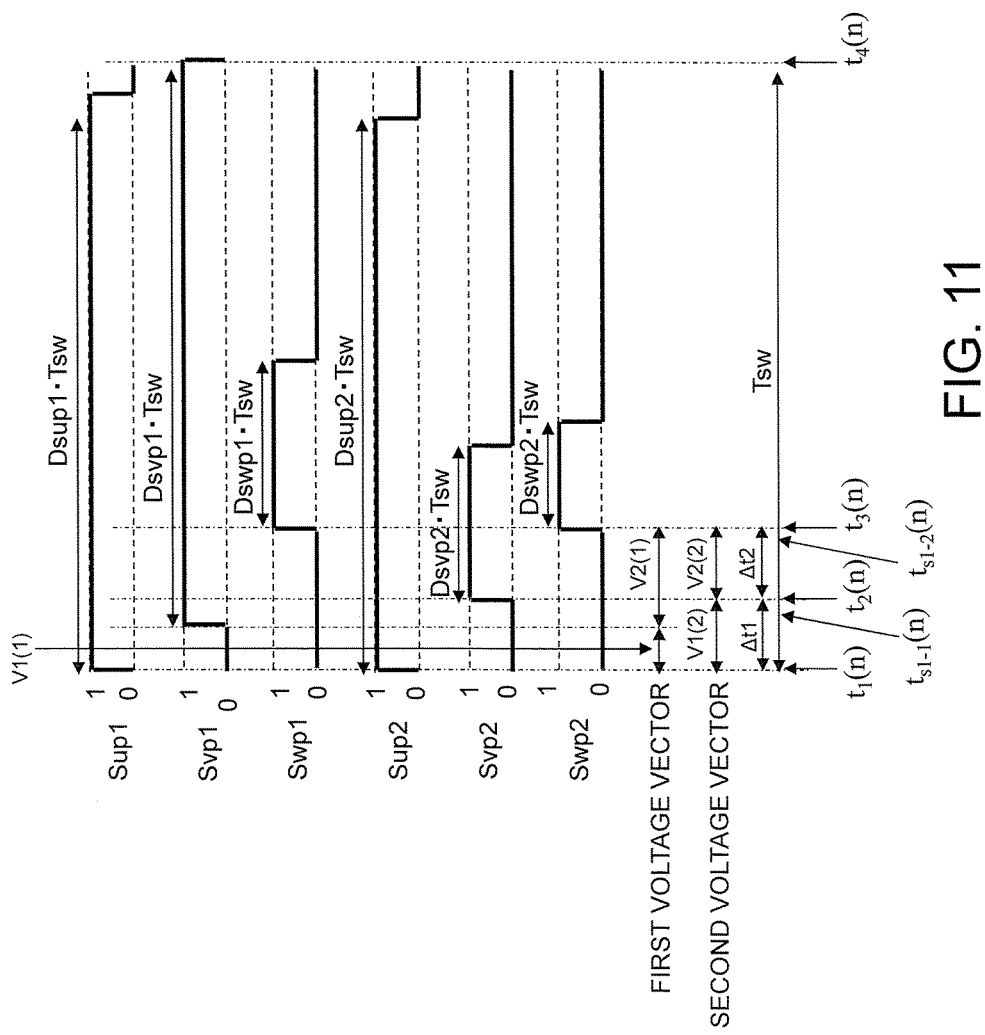
FIG. 11 is a view illustrating different operations to those of FIGS. 9 and 10 relating to the ON/OFF patterns of the semiconductor switches and the period of the switching signal in the current detection units, according to the first embodiment of this invention.

Further, FIG. 11 is a view illustrating different operations to those of FIGS. 9 and 10 relating to the ON/OFF patterns of the semiconductor switches and the period of the switching signal in the current detection units, according to the first embodiment of this invention, FIG. 11 showing an example of a similar case to that of FIG. 10, in which the currents Iu1, Iv1, Iw1 of the first windings cannot be detected. FIG. 11 shows a condition in which Vv1' is large such that Dsvp1× Tsw is larger than Tsw−Δt1. In this condition, even when Svp1 is switched OFF at a time t4 (n) at which the switching period Tsw ends, a pulse width corresponding to Dsvp1× Tsw cannot be obtained unless Svp1 is switched ON before the time t2 (n) arrives. As a result, V1 (1) cannot be formed within the time zone Δt1.

Likewise with regard to the second voltage application unit 3b, when Vv2' is small in FIG. 9, V2 (2) cannot be formed within the time shift Δt2. Moreover, when Vv2' is large, V1 (2) cannot be formed within the time zone Δt1.

This problem can be solved by increasing the switching period Tsw described in PTL 1 (referred to as the control period in PTL 1). When the time shift Δt1 and the time shift Δt2 are set at fixed times, the proportion of Tsw occupied by the time shift Δt1 and the time shift Δt2 can be reduced by increasing Tsw. As a result, current detection can be performed even when the intermediate phase voltage is small such that Dsvp1 is small or when the intermediate phase voltage is large such that Dsvp1 is large, as described above.

However, when Tsw is increased, a switching frequency given by the inverse of Tsw decreases, and when this frequency enters the audible range, noise from the switching frequency component increases. When the AC rotary machine 1a is used as a motor for an electric power steering, for example, the switching frequency is set to be no lower than 20 kHz (i.e. outside the band of the audible range).

The reason for this is that the audible range of a human being is between 20 Hz and 20 kHz, and therefore, by setting the switching frequency to be no lower than 20 kHz (i.e. outside the band of the audible range), the sound of the switching frequency component cannot be heard by human ears. When the switching frequency is reduced below 20 kHz in order to secure the time shift Δt1 and the time shift Δt2, however, the sound of the switching frequency component can be heard by human ears as noise.

Further, when noise is avoided by limiting an amplitude of the first voltage command so that the first intermediate phase voltage Emid1 remains within a range in which the time shifts Δt1 and Δt2 can be secured, the voltage applied to the AC rotary machine 1a is limited, and therefore a high output cannot be generated by the AC rotary machine 1a.

Returning to this invention, FIGS. 12A, 12B, 12C and 12D are illustrative views relating to a function of the first detectability determination unit 12a according to the first embodiment of this invention. More specifically, the first detectability determination unit 12a determines whether the currents of the first windings can be detected by the first current detector 4a or whether the currents of the second windings can be detected by the second current detector 4b by determining whether or not the voltage command value of the phase corresponding to the first intermediate phase voltage Emid1 and the voltage command value of the phase corresponding to the second intermediate phase voltage Emid2 are within a range no lower than a first predetermined value Vs1 and no higher than a second predetermined value Vs2.

Here, when the first intermediate phase voltage Emid1 and the second intermediate phase voltage Emid2 are equal to Vs1, this means that the ON time of the upper side arm element at the intermediate phase voltage during Tsw is equal to Tsw−Δt1. Hence, the first predetermined value Vs1 corresponds to an upper limit value at which the time shift Δt1 can be secured.

Meanwhile, when the first intermediate phase voltage Emid1 and the second intermediate phase voltage Emid2 are equal to Vs2, this means that Δt2 can be secured within Tsw by the ON time of the upper side arm element at the intermediate phase voltage. Hence, the second predetermined value Vs2 corresponds to a lower limit value at which the time shift Δt2 can be secured.

Figure 12:
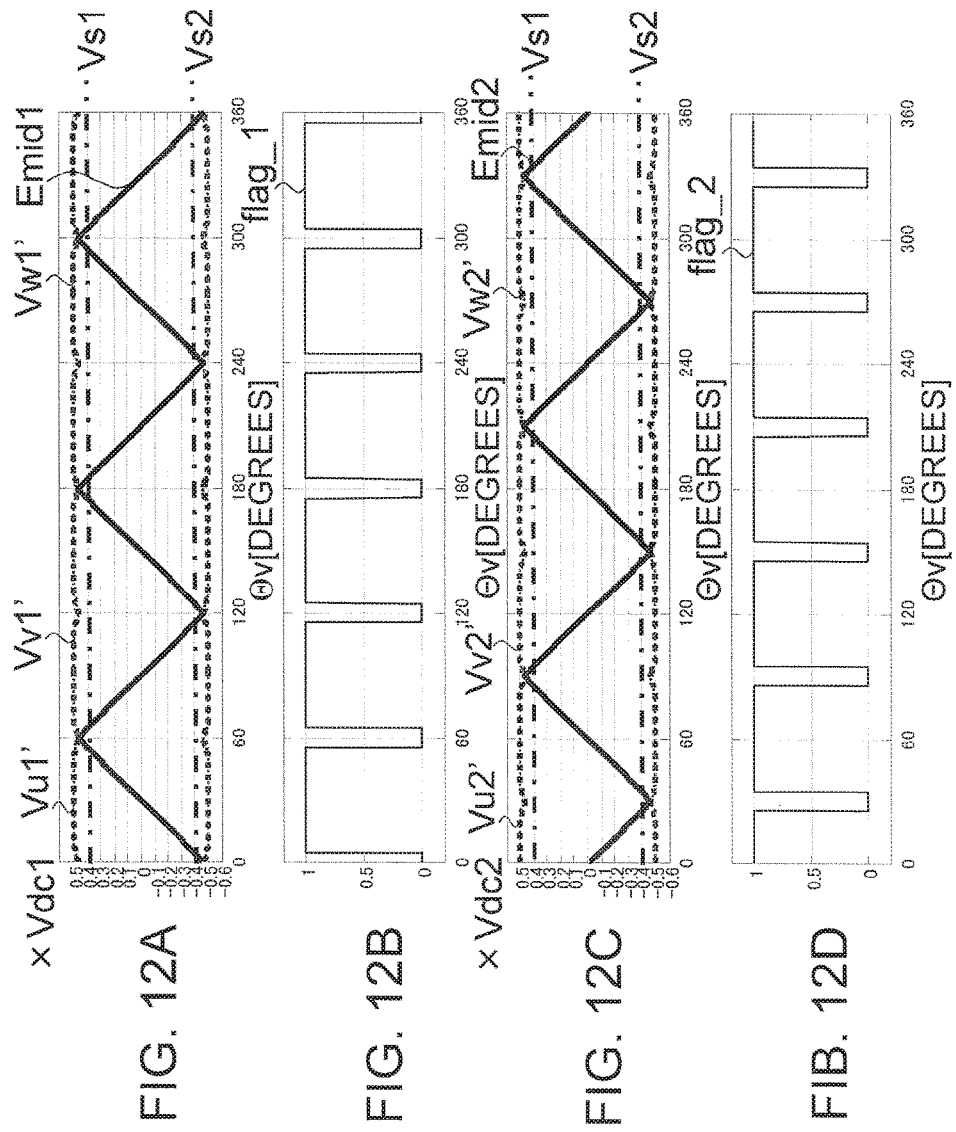
FIGS. 12A, 12B, 12C and 12D are illustrative views relating to a function of a first detectability determination unit according to the first embodiment of this invention.

In FIG. 12A, a dotted line indicates the first voltage commands Vu1', Vv1', Vw1' shown in FIG. 7B, a solid line indicates the first intermediate phase voltage Emid1, and dot-dash lines indicate the first predetermined value Vs1 and the second predetermined value Vs2. Here, Vs1=0.4 Vdc1 and Vs2=−0.4 Vdc1.

FIG. 12B shows the output of the first detectability determination unit 12a. The first detectability determination unit 12a determines whether or not the currents of the first windings can be detected by determining whether or not the first intermediate phase voltage Emid1 is within the range extending from the first predetermined value Vs1 to the second predetermined value Vs2. The first detectability determination unit 12a outputs the first detectability determination signal flag_1 at 1 when the first intermediate phase voltage Emid1 is within the range extending from the first predetermined value Vs1 to the second predetermined value Vs2, and outputs the first detectability determination signal flag_1 at 0 when the first intermediate phase voltage Emid1 is outside the range.

In FIG. 12C, a dotted line indicates the second voltage commands Vu2', Vv2', Vw2' shown in FIG. 8B, a solid line indicates the second intermediate phase voltage Emid2, and dot-dash lines indicate Vs1 and Vs2. FIG. 12D shows a second detectability determination signal flag_2 indicating whether or not the second intermediate phase voltage Emid2 is within the range extending from the first predetermined value Vs1 to the second predetermined value Vs2. The second detectability determination signal flag_2 is set at 1 when the second intermediate phase voltage Emid2 is within the range extending from the first predetermined value Vs1 to the second predetermined value Vs2, and set at 0 when the second intermediate phase voltage Emid1 is outside the range.

Note that the second detectability determination signal flag_2 serves as the output of a second detectability determination unit 701a to be described below in eighth to tenth embodiments using FIGS. 25, 28, and 31. As shown in FIG. 1, a second detectability determination unit is not used in the first embodiment, but is illustrated in FIGS. 12A to 12D for descriptive purposes.

Focusing on the first detectability determination signal flag_1, the first detectability determination signal flag_1 shifts to 0 in the vicinity of a voltage phase angle θv of 60×x (x: 0, 1, 2, 3, 4, 5, 6) degrees. Focusing on the second detectability determination signal flag_2, the second detectability determination signal flag_2 shifts to 0 in the vicinity of a voltage phase angle θv of 30+60×x (x: 0, 1, 2, 3, 4, 5) degrees. Hence, the voltage phase angles θv at which the first detectability determination signal flag_1 and the second detectability determination signal flag_2 shift to 0 deviate from each other by 30 degrees, and therefore, when flag_1 is at 0, flag_2 is at 1, and conversely when flag_1 is at 1, flag_2 is at 0.

Figure 13:
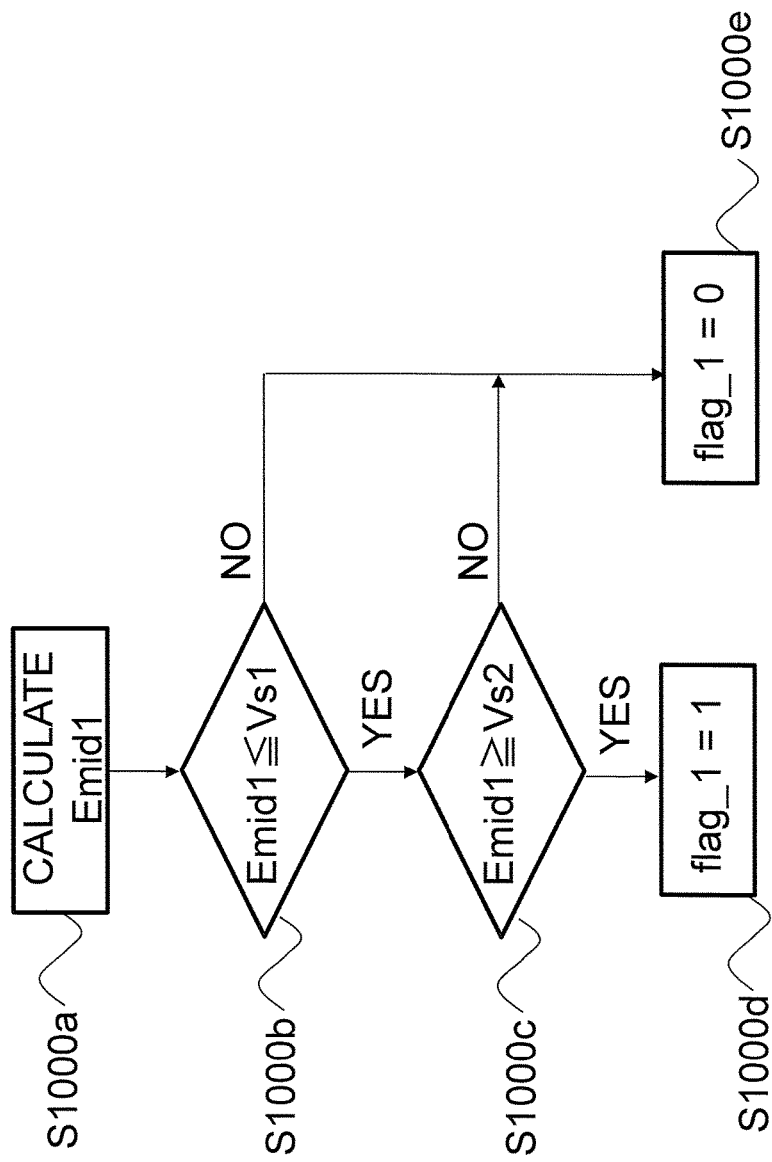
FIG. 13 is a flowchart showing a series of operations performed by the first detectability determination unit according to the first embodiment of this invention.

FIG. 13 is a flowchart showing a series of operations performed by the first detectability determination unit 12a according to the first embodiment of this invention. In step S1000a, the first detectability determination unit 12a calculates the first intermediate phase voltage Emid1 on the basis of the first voltage commands Vu1', Vv1', Vw1'. In step S1000b, the first detectability determination unit 12a determines whether or not the first intermediate phase voltage Emid1 is equal to or smaller than the first predetermined value Vs1. When "YES" is obtained, the routine advances to step S1000c, and when "NO" is obtained, the routine advances to step S1000e.

In step S1000c, the first detectability determination unit 12a determines whether or not the first intermediate phase voltage Emid1 equals or exceeds the second predetermined value Vs2. When "YES" is obtained, the routine advances to step S1000d, and when "NO" is obtained, the routine advances to step S1000e.

In a case where the routine advances to step S1000d, the first detectability determination unit 12a inserts 1 into the first detectability determination signal flag_1. In a case where the routine advances to step S1000e, the first detectability determination unit 12a inserts 0 into the first detectability determination signal flag_1.

Finally, when the first detectability determination signal flag_1 is at 1, the first detectability determination unit 12a determines that the currents of the first windings are detectable, and therefore switches the switch 7a so that the currents Id1, Iq1 on two rotational axes, determined from the first winding currents, are output respectively as Id', Iq'. When the first detectability determination signal flag_1 is at 0, on the other hand, the first detectability determination unit 12a determines that the currents of the first windings are undetectable, and therefore switches the switch 7a so that the currents Id2, Iq2 on two rotational axes, determined from the second winding currents, are output respectively as Id', Iq'.

According to the first embodiment, as described above, a determination as to whether or not the first current detection unit 4a can detect the currents of the first windings is made on the basis of the first voltage commands. When it is determined that the currents of the first windings are detectable, the first voltage commands and second voltage commands are calculated on the basis of the currents of the first windings, and when it is determined that the currents of the first windings are undetectable, the first voltage commands and second voltage commands are calculated on the basis of the currents of the second windings.

By providing this configuration, the amplitude of the first voltage commands and the second voltage commands can be increased without lengthening the switching period Tsw, as in PTL 1, and without limiting the amplitude of the first voltage commands in order to secure a time shift for the first intermediate phase voltage. As a result, the output of the AC rotary machine 1a can be increased while keeping noise generated thereby low.

Second Embodiment

In a second embodiment, a first detectability determination unit 12b that determines whether or not the currents of the first windings are detectable by different processing to that of the first detectability determination unit 12a according to the first embodiment will be described. The second embodiment is configured basically identically to the first embodiment shown in FIG. 1, and differs only in that the first detectability determination unit 12a shown in FIG. 1 is replaced with the first detectability determination unit 12b. Accordingly, the following description centers on the first detectability determination unit 12b that differs from the first embodiment.

Figure 14:
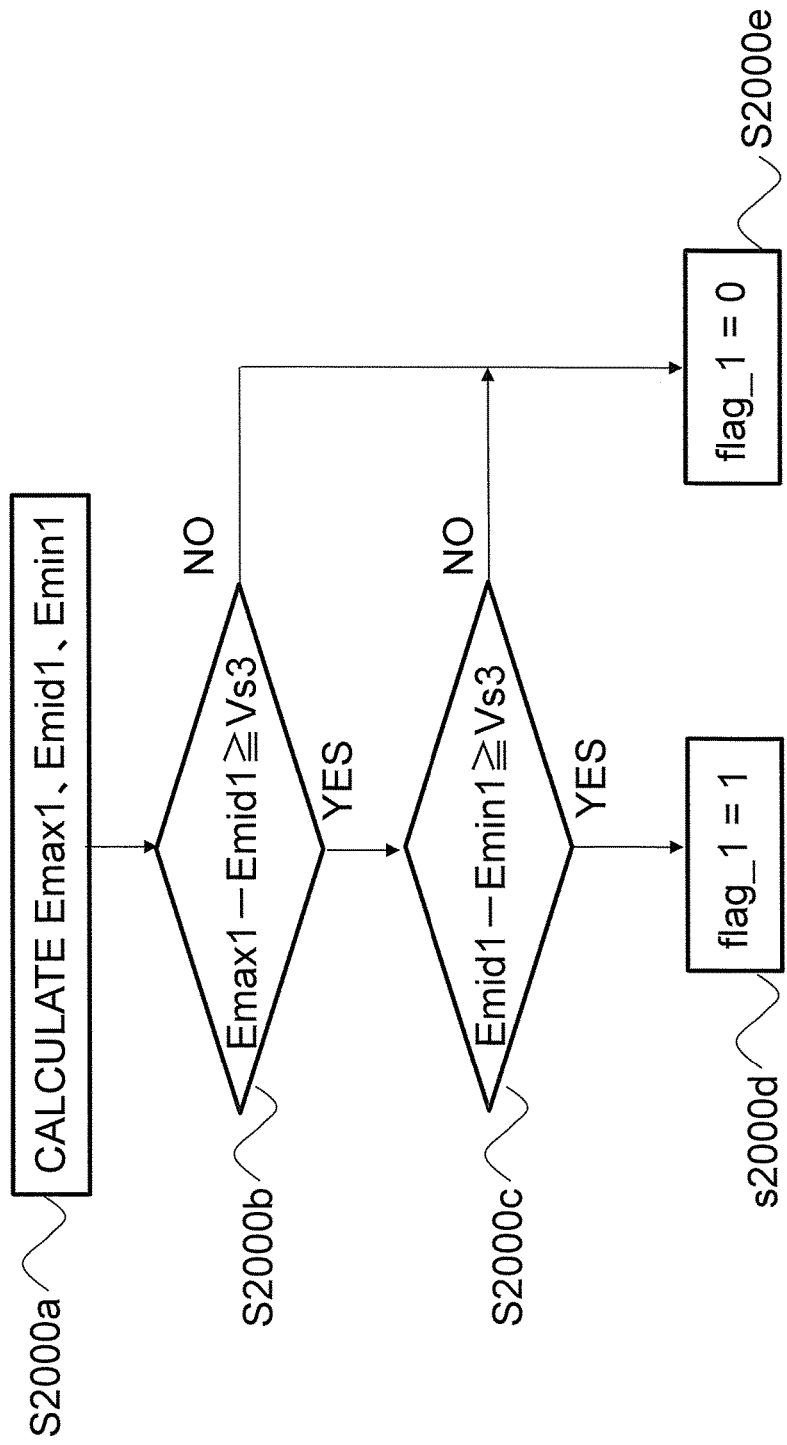
FIG. 14 is a flowchart showing a series of operations performed by a first detectability determination unit according to a second embodiment of this invention.

FIG. 14 is a flowchart showing a series of operations performed by the first detectability determination unit 12b according to the second embodiment of this invention. In step S2000a, the first detectability determination unit 12b determines the first maximum phase voltage Emax1, the first intermediate phase voltage Emid1, and the first minimum phase voltage Emin1 from the first voltage commands Vu1', Vv1', Vw1'.

In step S2000b, the first detectability determination unit 12b determines whether or not a difference Emax1−Emid1 between the first maximum phase voltage and the first intermediate phase voltage equals or exceeds a third predetermined value Vs3. When "YES" is obtained, the routine advances to step S2000c, and when "NO" is obtained, the routine advances to step S2000e.

In step S2000c, the first detectability determination unit 12b determines whether or not a difference Emid1−Emin1 between the first intermediate phase voltage and the first minimum phase voltage equals or exceeds the third predetermined value Vs3. When "YES" is obtained, the routine advances to step S2000d, and when "NO" is obtained, the routine advances to step S2000e.

In a case where the routine advances to step S2000d, the first detectability determination unit 12b inserts 1 into the first detectability determination signal flag_1. In a case where the routine advances to step S2000e, the first detectability determination unit 12b inserts 0 into the first detectability determination signal flag_1.

Here, the third predetermined value Vs3 may be determined on the basis of a ratio between the time shift Δt1 or Δt2 and the switching period Tsw. For example, when the time shift Δt1=Δt2=5 μs and the switching period is set as Tsw, the third predetermined value Vs3 is Δt1/Tsw×Vdc=0.1 Vdc.

Figure 15A:
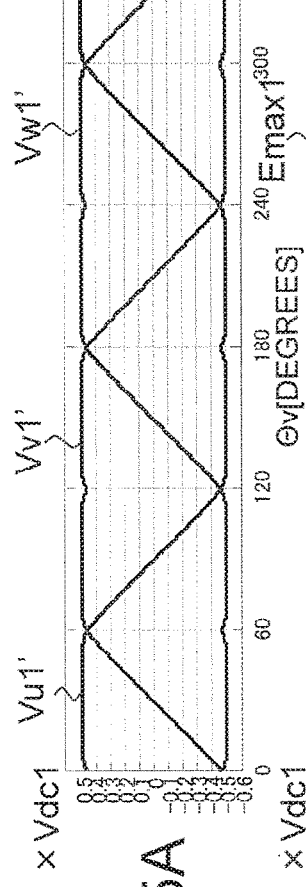
FIGS. 15A, 15B, 15C and 15D are views showing waveforms described in the steps of FIG. 14 in a case where a third predetermined value is set at 0.1 Vdc, according to the second embodiment of this invention.
Figure 15B:
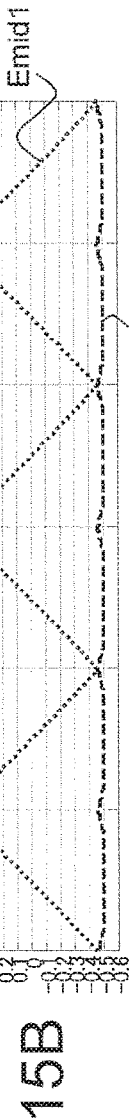

FIGS. 15A, 15B, 15C and 15D are views showing waveforms described in the steps of FIG. 14 in a case where the third predetermined value Vs3 is set at 0.1 Vdc, according to the second embodiment of this invention. More specifically, FIG. 15A shows the first voltage commands Vu1', Vv1', Vw1', and FIG. 15B shows the first maximum phase voltage Emax1, the first intermediate phase voltage Emid1, and the first minimum phase voltage Emin1 mentioned in step S2000a.

Figure 15C:
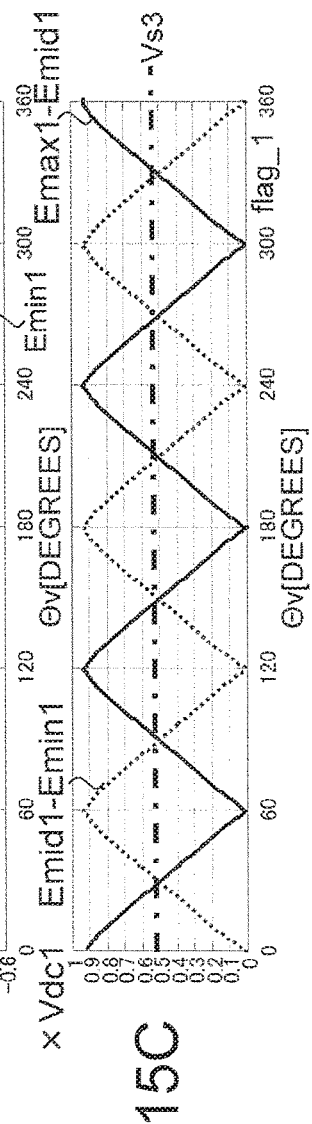
Figure 15D:
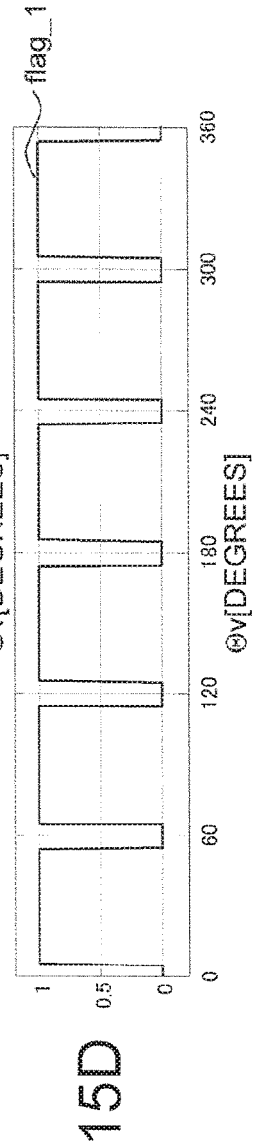

FIG. 15C shows the difference Emax1−Emid1 between the first maximum phase voltage and the first intermediate phase voltage and the difference Emid1−Emin1 between the first intermediate phase voltage and the first minimum phase voltage, mentioned respectively in steps S2000b and S2000c. Further, FIG. 15D shows the first detectability determination signal flag_1 mentioned in steps S2000d and S2000e.

According to the second embodiment, as described above, the difference between the first maximum phase voltage and the first intermediate phase voltage and the difference between the first intermediate phase voltage and the first minimum phase voltage are respectively calculated, and when the values thereof are smaller than the third predetermined value, the currents of the first windings are determined to be undetectable. By performing this determination processing, identical effects to those of the first embodiment can be obtained.

Note that in the second embodiment, the first detectability determination unit 12b determines the detectability of the currents of the first windings on the basis of the first voltage commands Vu1', Vv1', Vw1' serving as the output of the offset calculator 11a. However, identical calculation results are obtained for Emax1−Emid1 and Emid1−Emin1 when Emax1−Emid1 and Emid1−Emin1 are calculated on the basis of the first voltage commands Vu1, Vv1, Vw1 serving as the input of the offset calculator 11a instead of the first voltage commands Vu1', Vv1', Vw1' serving as the output of the offset calculator 11a. Hence, identical effects to those obtained when Emax1−Emid1 and Emid1−Emin1 are calculated on the basis of the first voltage commands Vu1', Vv1', Vw1' are obtained with a configuration in which the first voltage commands Vu1, Vv1, Vw1 are input into the first detectability determination unit 12b.

Third Embodiment

In a third embodiment, a first detectability determination unit 12c that determines whether or not the currents of the first windings are detectable by different processing to that of the first detectability determination unit 12a according to the first embodiment and the first detectability determination unit 12b according to the second embodiment will be described. The third embodiment is configured basically identically to the first embodiment shown in FIG. 1, and differs only in that the first detectability determination unit 12a shown in FIG. 1 is replaced with the first detectability determination unit 12c. Accordingly, the following description centers on the first detectability determination unit 12c that differs from the first and second embodiments.

The first detectability determination unit 12c calculates the voltage phase angle θv on the basis of the first voltage commands Vu1', Vv1', Vw1' using Equation (21), shown below, and determines the detectability of the currents of the first windings in accordance with a region of the voltage phase angle θv.

[Math. 1]

$$\theta_v = \arctan\left(\frac{\frac{\sqrt{3}}{2}(V'_{v1} - V'_{w1})}{V'_{u1} - 0.5V'_{v1} - 0.5V'_{w1}}\right) \quad (21)$$

In the first embodiment described above, the currents of the first windings are determined to be undetectable when the voltage phase angle θv is in the vicinity of 60×x (x: 0, 1, 2, 3, 4, 5, 6) degrees. Therefore, when θv obtained in the calculation based on the first voltage commands is within a range no lower than 60×x−α and no higher than 60×x+α (where α is a margin), the first detectability determination unit 12c determines that the currents of the first windings are undetectable, and outputs 0 as flag_1. When θv is outside this range, on the other hand, the first detectability determination unit 12c determines that the currents of the first windings are detectable, and outputs 1 as flag_1.

Note that the margin α is determined from the time shifts Δt1 and Δt2, the maximum value of the first voltage commands, and so on, but is set at a magnitude no greater than 30 degrees.

According to the third embodiment, as described above, the voltage phase angle of the first voltage commands is calculated, whereupon the detectability of the currents of the first windings is determined in accordance with the region of the voltage phase angle. Likewise with this configuration, identical effects to those of the first and second embodiments can be obtained.

Note that in the third embodiment, the first detectability determination unit 12c determines the detectability of the currents of the first windings on the basis of the first voltage commands Vu1', Vv1', Vw1' serving as the output of the offset calculator 11a. However, an identical calculation result to that of Equation (21) is obtained when the detectability of the currents of the first windings is calculated on the basis of the first voltage commands Vu1, Vv1, Vw1 serving as the input of the offset calculator 11a instead of the first voltage commands Vu1', Vv1', Vw1' serving as the output of the offset calculator 11a. Hence, identical effects to those obtained when the detectability of the currents of the first windings is calculated on the basis of the first voltage commands Vu1', Vv1', Vw1' are obtained with a configuration in which the first voltage commands Vu1, Vv1, Vw1 are input into the first detectability determination unit 12c.

All other methods of determining the detectability of the currents of the first windings on the basis of the voltage phase angle θv after determining the voltage phase angle θv on the basis of the voltage commands, such as a method of determining the voltage phase angle θv on the basis of the voltage commands Vd, Vq on two rotational axes, are included in this invention.

Fourth Embodiment

Figure 16:
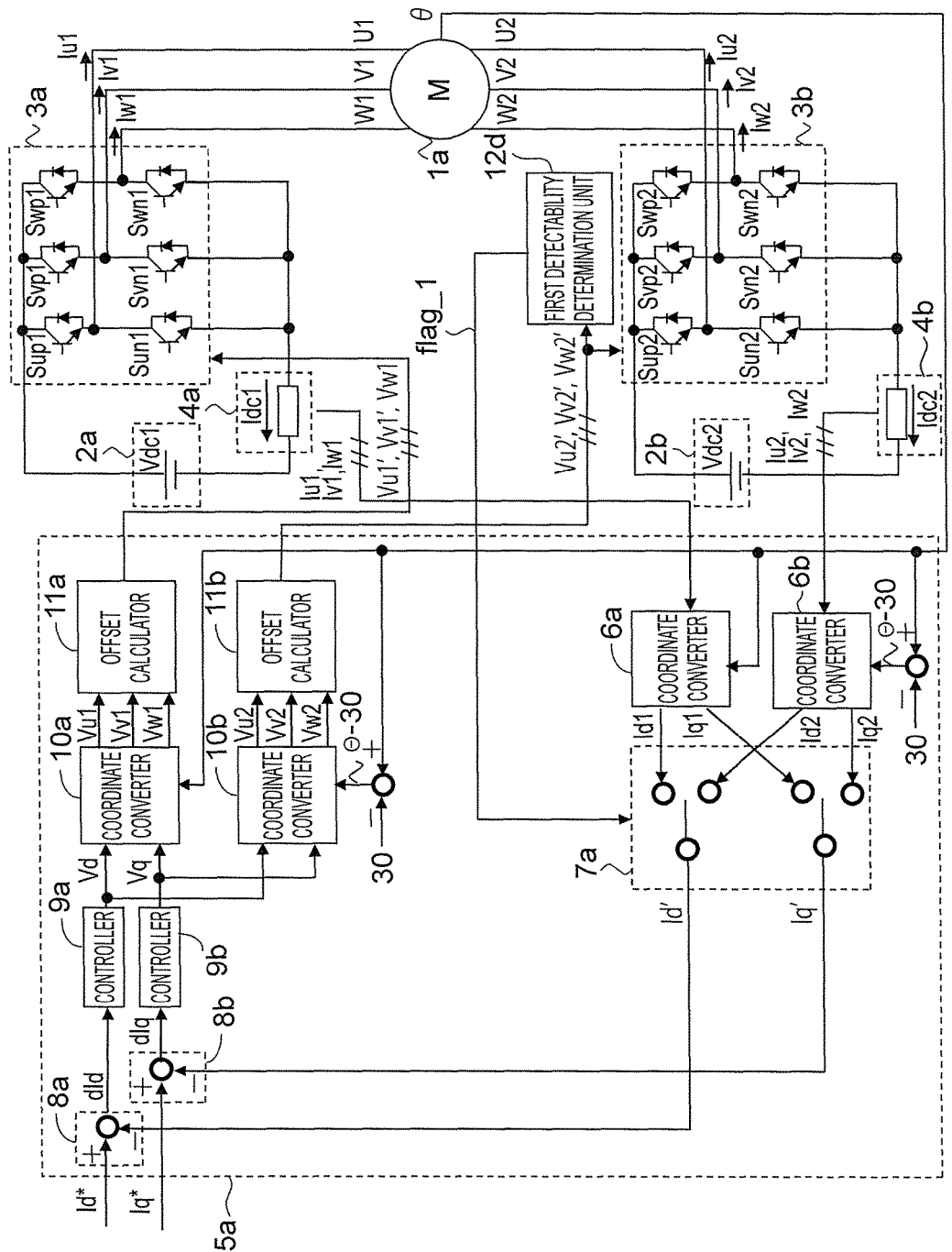
FIG. 16 is a view showing an overall configuration of a control apparatus for an AC rotary machine according to a fourth embodiment of this invention.

In a fourth embodiment, a first detectability determination unit 12d that determines whether or not the currents of the first windings are detectable by different processing to that of the first detectability determination units 12a, 12b, and 12c according to the first to third embodiments will be described. FIG. 16 is a view showing an overall configuration of a control apparatus for an AC rotary machine according to the fourth embodiment of this invention. In the fourth embodiment, the first detectability determination unit 12d determines the detectability of the currents of the first windings on the basis of the second voltage commands Vu2', Vv2', Vw2' rather than the first voltage commands Vu1', Vv1', Vw1'. Accordingly, the following description centers on the first detectability determination unit 12d that differs from the first to third embodiments.

The first detectability determination unit 12d shown in FIG. 16 calculates the voltage phase angle θv on the basis of the second voltage commands Vu2', Vv2', Vw2' using Equation (22), shown below, and determines the detectability of the currents of the first windings in accordance with the region of the voltage phase angle θv.

[Math. 2]

$$\theta_v = \arctan\left(\frac{\frac{\sqrt{3}}{2}(V'_{v2} - V'_{w2})}{V'_{u2} - 0.5V'_{v2} - 0.5V'_{w2}}\right) + 30 \qquad (22)$$

In the first embodiment described above, the currents of the first windings are determined to be undetectable when the voltage phase angle θv is in the vicinity of 60×x (x: 0, 1, 2, 3, 4, 5, 6) degrees. Therefore, when θv obtained in the calculation based on the second voltage commands is within a range of no lower than 60×x−α and no higher than 60×x+α (where α is a margin), the first detectability determination unit 12d determines that the currents of the first windings are undetectable, and outputs 0 as flag_1. When θv is outside this range, on the other hand, the first detectability determination unit 12d determines that the currents of the first windings are detectable, and outputs 1 as flag_1.

Note that the margin α is determined from the time shifts Δt1 and Δt2, the maximum value of the first voltage commands, and so on, but is set at a magnitude no greater than 30 degrees.

According to the fourth embodiment, as described above, the voltage phase angle of the second voltage commands is calculated, whereupon the detectability of the currents of the first windings is determined in accordance with the region of the voltage phase angle. Likewise with this configuration, identical effects to those of the first to third embodiments can be obtained.

Note that in the fourth embodiment, the first detectability determination unit 12d determines the detectability of the currents of the first windings on the basis of the second voltage commands Vu2', Vv2', Vw2' serving as the output of the offset calculator 11b. However, an identical calculation result to that of Equation (22) is obtained when the detectability of the currents of the first windings is calculated on the basis of the second voltage commands Vu2, Vv2, Vw2 serving as the input of the offset calculator 11b instead of the second voltage commands Vu2', Vv2', Vw2' serving as the output of the offset calculator 11b. Hence, identical effects to those obtained when the calculation is performed on the basis of the second voltage commands Vu2', Vv2', Vw2' are obtained with a configuration in which the second voltage commands Vu2, Vv2, Vw2 are input into the first detectability determination unit 12d.

Furthermore, an average of the voltage phase angle θv based on the first voltage commands, obtained from the third embodiment, and the voltage phase angle θv based on the second voltage commands, obtained from the fourth embodiment, may be calculated, whereupon the detectability of the currents of the first windings may be determined on the basis of the averaged voltage phase angle θv. In this case, an effect of suppressing a noise component included in the voltage phase angle θv by averaging the voltage phase angle θv can be obtained.

Fifth Embodiment

Figure 17:
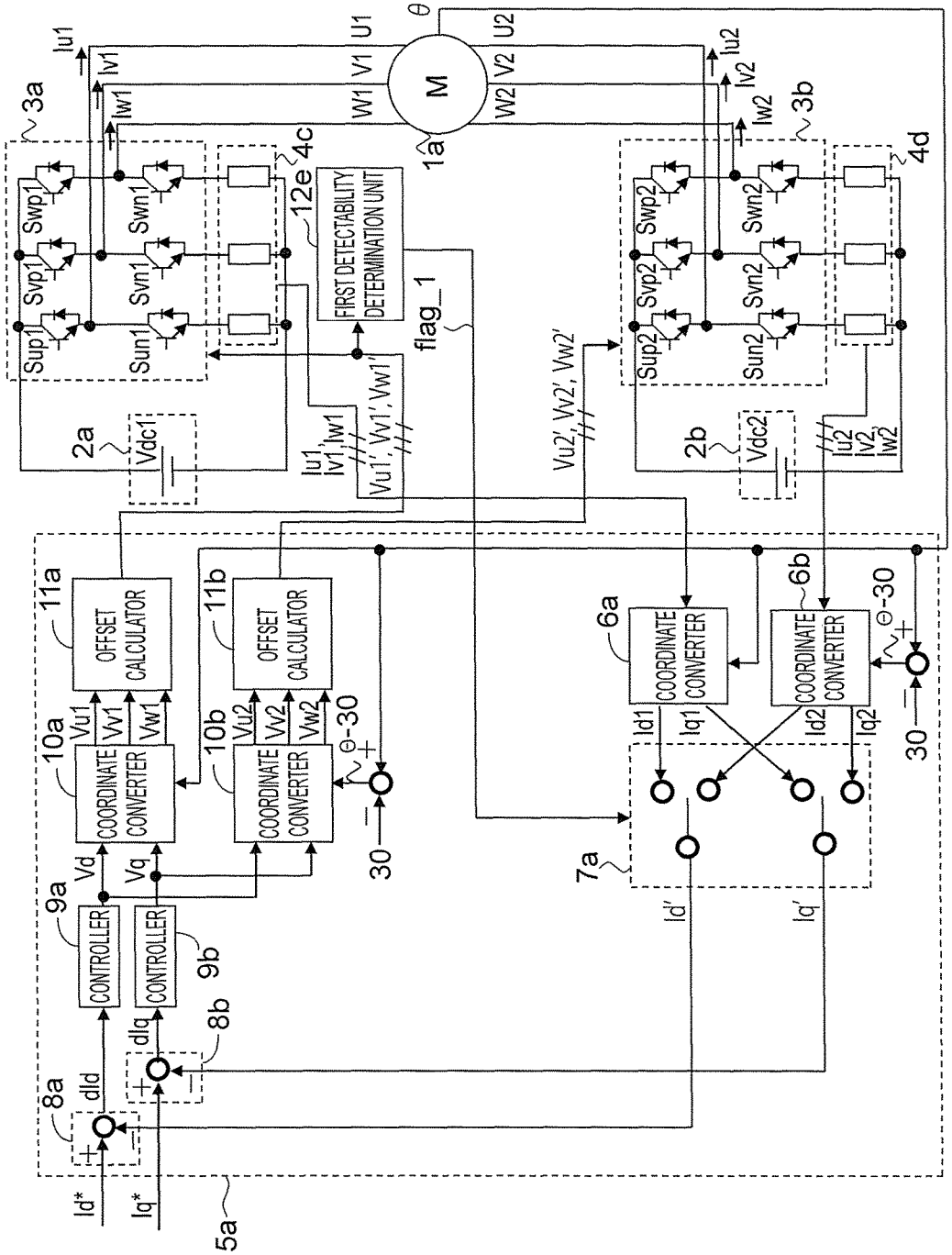
FIG. 17 is a view showing an overall configuration of a control apparatus for an AC rotary machine according to a fifth embodiment of this invention.

FIG. 17 is a view showing an overall configuration of a control apparatus for an AC rotary machine according to a fifth embodiment of this invention. The fifth embodiment differs from the first to fourth embodiments in including a first current detection unit 4c, a second current detection unit 4d, and a first detectability determination unit 12e in place of the first current detection unit 4a, the second current detection unit 4b, and the first detectability determination unit 12a (12b to 12d). Accordingly, the following description centers on these differences.

The first current detection unit 4c according to the fifth embodiment is formed by providing current sensors such as shunt resistors or current transformers (CTs) respectively in series with the lower side arm elements of the respective phases (Sun1, Svn1, Swn1) of the first voltage application unit 3a. FIG. 18 is a view showing relationships between the first voltage vector V0 (1) to V7 (1) corresponding to the ON/OFF conditions of the semiconductor switches Sup1 to Swn1 and the currents Iu1, Iv1, Iw1 of the first windings, according to the fifth embodiment of this invention. Note that with respect to Sup1 to Swn1 in FIG. 18, "1" and "0" respectively indicate a condition in which the switch is ON and a condition in which the switch is OFF. The first current detection unit 4c detects the currents Iu1, Iv1, Iw1 of the first windings individually on the basis of the relationships shown in FIG. 18.

In the fifth embodiment, current sensors are provided in series with the lower arm elements of the respective phases, and therefore current detection is possible only in a phase where the lower side arm elements are switched ON. For example, when the first voltage vector is at V1 (1), the switches Sup1, Svn1, and Swn1 are switched ON, and therefore, in the U1 phase, the upper side arm elements are switched ON, whereas in the V1 phase and the W1 phase, the lower side arm elements are switched ON. As a result, the current Iv1 that flows in the V1 phase and the current Iw1 that flows in the W1 phase are detectable, but the current Iu1 that flows in the U1 phase is undetectable. Accordingly, Iu1 is detected from Iv1 and Iw1 using the fact that the sum of the currents of the three phases is zero.

Hence, when the first voltage vector is at V1 (1), currents Iu1_s, Iv1_s, Iw1_s flowing through the current sensors provided on the U1, V1, and W1 phases are 0, −Iv1, and −Iw1, respectively (see FIG. 18). Similarly, currents Iu_s, Iv_s, Iw_s flowing through the current sensors when the first voltage vector is at V3 (1) and V5 (1) are as shown in FIG. 18.

When the first voltage vector is at V2 (1), V4 (1), and V6 (1), only one of the currents Iu1, Iv1, Iw1 of the first windings is detectable, and therefore the currents of the three phases cannot be obtained.

The second current detection unit 4d is formed by providing current sensors such as shunt resistors or current transformers (CTs) respectively in series with the lower side arm elements of the respective phases (Sun2, Svn2, Swn2) of the second voltage application unit 3b. FIG. 19 is a view showing relationships between the second voltage vector V0 (2) to V7 (2) corresponding to the ON/OFF conditions of the semiconductor switches Sup2 to Swn2 and the currents Iu2, Iv2, Iw2 of the second windings, according to the fifth embodiment of this invention. Note that with respect to Sup2 to Swn2 in FIG. 19, "1" and "0" respectively indicate a condition in which the switch is ON and a condition in which the switch is OFF. The second current detection unit 4d detects the currents Iu2, Iv2, Iw2 of the second windings individually on the basis of the relationships shown in FIG. 19.

Since the current sensors are provided in series with the lower arm elements of the respective phases, current detection is possible only in a phase where the lower side arm elements are switched ON. For example, when the second voltage vector is at V1 (2), the switches Sup2, Svn2, and Swn2 are switched ON, and therefore, in the U2 phase, the upper side arm elements are switched ON, whereas in the V2 phase and the W2 phase, the lower side arm elements are switched ON. As a result, the current Iv2 that flows in the V2 phase and the current Iw2 that flows in the W2 phase are detectable, but the current Iu2 that flows in the U2 phase is undetectable. Accordingly, Iu2 is detected from Iv2 and Iw2 using the fact that the sum of the currents of the three phases is zero.

Hence, when the second voltage vector is at V1 (2), currents Iu2_s, Iv2_s, Iw2_s flowing through the current sensors provided on the U2, V2, and W2 phases are 0, –Iv2, and –Iw2, respectively (see FIG. 19). Similarly, the currents Iu2_s, Iv2_s, Iw2_s flowing through the current sensors when the second voltage vector is at V3 (2) and V5 (2) are as shown in FIG. 19.

When the second voltage vector is at V2 (2), V4 (2), and V6 (2), only one of the currents Iu2, Iv2, Iw2 of the first windings is detectable, and therefore the currents of the three phases cannot be obtained.

Figure 20:
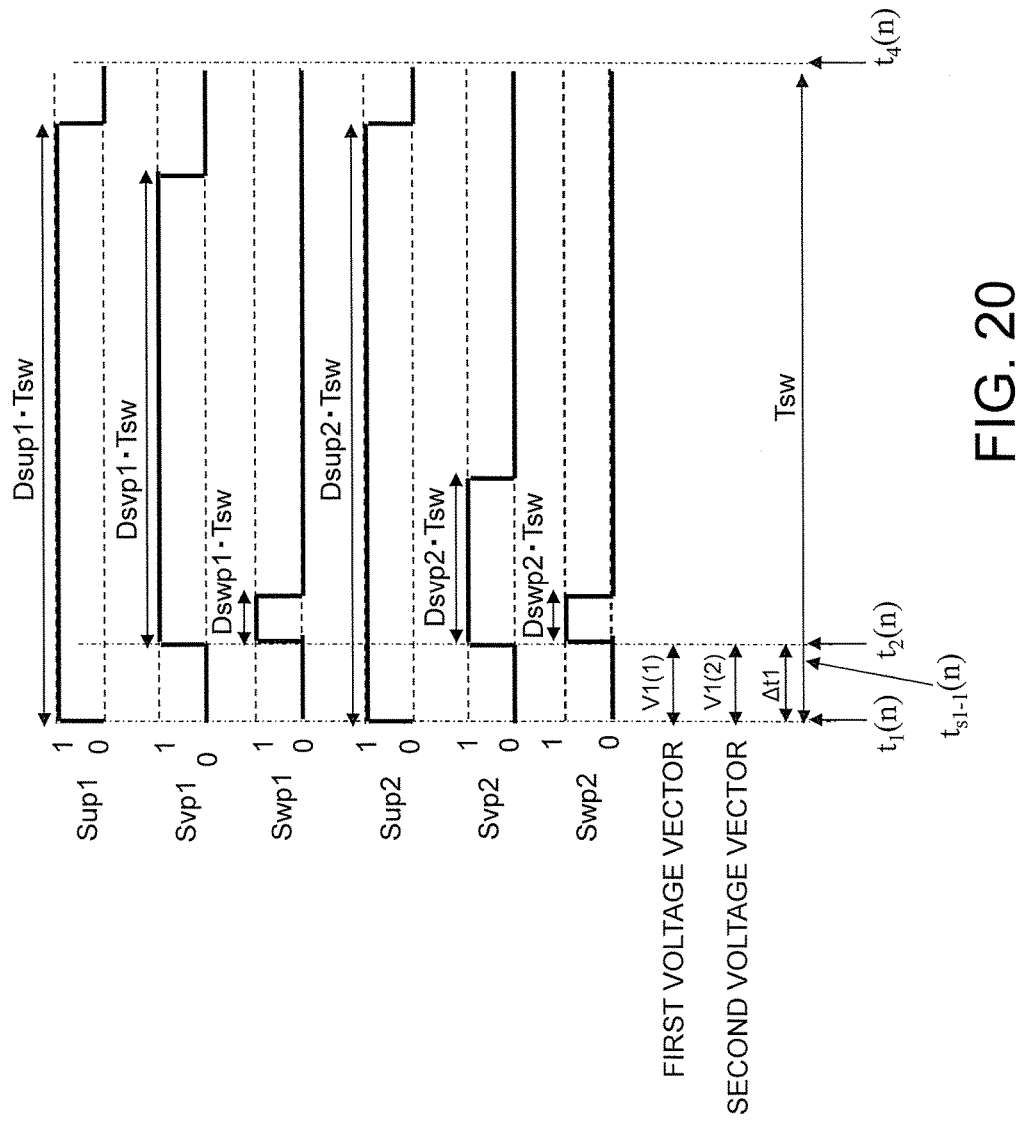
FIG. 20 is a view illustrating an operation relating to the ON/OFF patterns of the semiconductor switches and the period of the switching signal in the current detection units, according to the fifth embodiment of this invention.

FIG. 20 is a view illustrating an operation relating to the ON/OFF patterns of the semiconductor switches and the period of the switching signal in the current detection units, according to the fifth embodiment of this invention. More specifically, FIG. 20 is a view showing relationships between the ON/OFF patterns of the semiconductor switches Sup1, Svp1, Swp1 of the first voltage application unit 3a and the semiconductor switches Sup2, Svp2, Swp2 of the second voltage application unit 3b and the switching period Tsw in the first current detection unit 4c and the second current detection unit 4d.

In FIG. 20, similarly to FIG. 9 described above, when the first maximum phase voltage Emax1, the first intermediate phase voltage Emid1, and the first minimum phase voltage Emin1 are set in descending order in relation to the first voltage commands Vu1', Vv1', Vw1', the relationships shown in Equations (15) to (17) are assumed to be established.

Similarly, when the second maximum phase voltage Emax2, the second intermediate phase voltage Emid2, and the second minimum phase voltage Emin2 are set in descending order in relation to the second voltage commands Vu2', Vv2', Vw2', the relationships shown in Equations (18) to (20) are assumed to be established.

At the time t1 (n), Sup1 and Sup2 are set at 1 and Svp1, Swp1, Svp2, and Swp2 are set at 0, whereupon this condition is maintained until the time t2 (n) arrives following the elapse of Δt1. In accordance with FIGS. 18 and 19, the first voltage vector and the second voltage vector are at V1 (1) and V1 (2), respectively, between the times t1 (n) and t2 (n). The currents of the first windings are detected at the time ts1-1 (n) between the times t1 (n) and t2 (n).

The first voltage vector is at V1 (1), and therefore, in accordance with FIG. 18, Iv1_s and Iw1_s are respectively equal to Iv1, Iw1, while Iu1 is determined from Iv1 and Iw1 using the fact that the sum of the currents of the three phases is zero. Further, at the time ts1-1 (n), the currents of the second windings are detected. Here, the second voltage vector is at V1 (2), and therefore, in accordance with FIG. 19, Iv2_s and Iw2_s are respectively equal to Iv2, Iw2, while Iu2 is determined from Iv2 and Iw2 using the fact that the sum of the currents of the three phases is zero.

Next, at the time t2 (n), Svp1, Svp2, Swp1, and Swp2 are set at 1. A pulse width (a time during which "1" is maintained) of Sup1 to Swp2 is determined from a product of the ON duties Dsup1 to Dswp2 corresponding to the respective switches and the switching period Tsw.

In the fifth embodiment, as described above, the switches of the upper side arm elements are switched ON initially in the phase corresponding to the first maximum phase voltage Emax1, and then switched ON in the phase corresponding to the first intermediate phase voltage Emid1 and the phase corresponding to the first minimum phase voltage Emin1 at intervals of the time shift Δt1. By performing switching in this manner, a first voltage vector (V1 (1) or V1 (3) or V1 (5)) with which two of the currents Iu1, Iv1, Iw1 of the first windings can be detected is formed, as shown in FIG. 18, and a second voltage vector (V1 (2) or V3 (2) or V5 (2)) with which two of the currents Iu2, Iv2, Iw2 of the second windings can be detected is formed, as shown in FIG. 19.

Depending on the voltage command value of the phase corresponding to the first intermediate phase voltage Emid1, however, it may be possible to detect only one of the currents Iu1, Iv1, Iw1 of the first windings. A case of this type is illustrated in the example shown in FIG. 20. When Vv1 is larger than the first predetermined value Vs1 and Dsvp1×Tsw is larger than Tsw−Δt1, a pulse width corresponding to Dsvp1×Tsw cannot be obtained unless Svp1 is switched ON before the time t2 (n), even in a case where Svp1 is switched OFF at the time t4 (n) indicating the end of the switching period Tsw. As a result, V1 (1) cannot be formed within the time zone of Δt1, and therefore the currents of the first windings cannot be detected.

Likewise with respect to the second voltage application unit 3b, when Vv2' is larger than the first predetermined value Vs1 in FIG. 20, V1 (2) cannot be formed within the time zone of the time shift Δt1, and therefore the currents of the second windings cannot be detected.

Figure 21A:
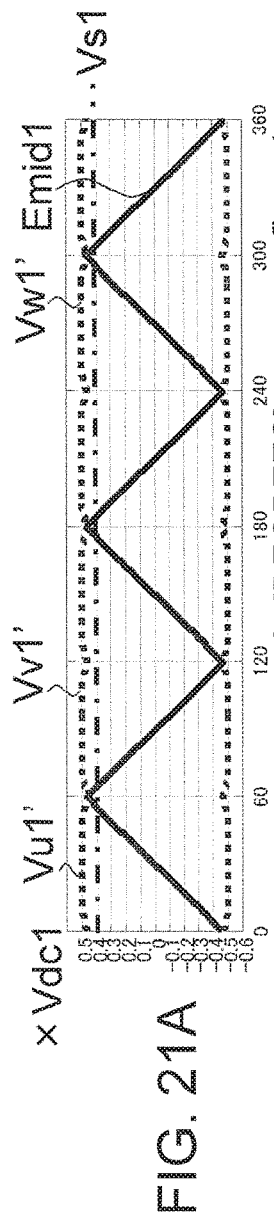
FIGS. 21A, 21B, 21C and 21D are illustrative views relating to a function of a first detectability determination unit according to the fifth embodiment of this invention.

FIGS. 21A, 21B, 21C and 21D are illustrative views relating to a function of the first detectability determination unit 12e according to the fifth embodiment of this invention. More specifically, the first detectability determination unit 12e determines whether or not the voltage command value of the phase corresponding to the first intermediate phase voltage Emid1 and the voltage command value of the phase corresponding to the second intermediate phase voltage Emid2 are within a range not exceeding the first predetermined value Vs1. In FIG. 21A, a dotted line indicates the first voltage commands Vu1', Vv1', Vw1' shown in FIG. 7B, a solid line indicates the first intermediate phase voltage Emid1, and a dot-dash line indicates the first predetermined value Vs1. Similarly to the first embodiment, as shown in FIG. 12A to 12D, Vs1=0.4 Vdc1 is set.

Figure 21B:
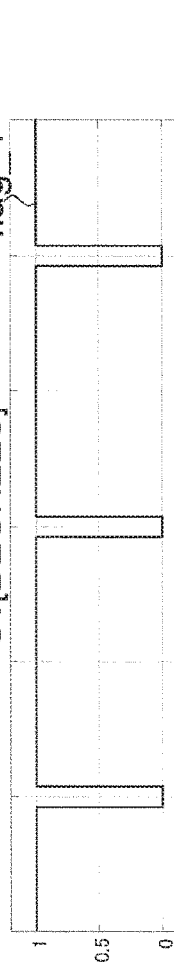

FIG. 21B shows the output of the first detectability determination unit 12e. The first detectability determination unit 12e determines whether or not the currents of the first windings are detectable by determining whether or not the first intermediate phase voltage Emid1 is within a range not exceeding the first predetermined value Vs1. The first detectability determination unit 12e outputs the first detectability determination signal flag_1 at 1 when the first intermediate phase voltage Emid1 is within a range not exceeding the first predetermined value Vs1, and outputs the first detectability determination signal flag_1 at 0 when the first intermediate phase voltage Emid1 is outside this range.

Figure 21C:
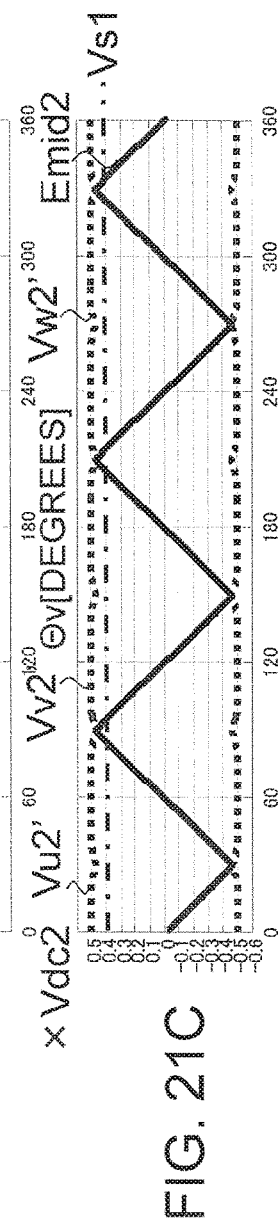
Figure 21D:
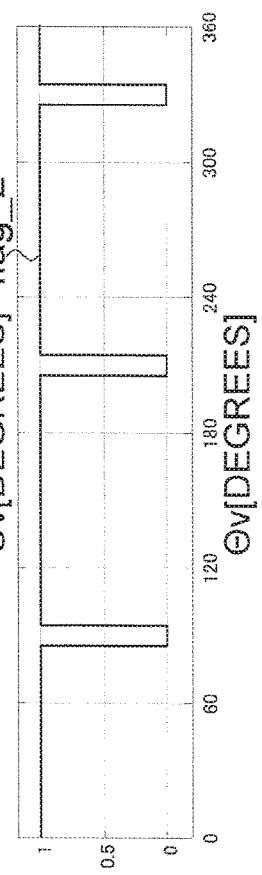

In FIG. 21C, a dotted line indicates the second voltage commands Vu2', Vv2', Vw2' shown in FIG. 8B, a solid line indicates the second intermediate phase voltage Emid2, and a dot-dash line indicates Vs1. FIG. 21D shows the second detectability determination signal flag_2 indicating whether or not the second intermediate phase voltage Emid2 is within a range not exceeding the first predetermined value Vs1. The second detectability determination signal flag_2 is set at 1 when the second intermediate phase voltage Emid2 is within this range, and set at 0 when the second intermediate phase voltage Emid1 is outside the range.

Note that the second detectability determination signal flag_2 serves as the output of the second detectability determination unit 701a to be described below in eighth to tenth embodiments using FIGS. 25, 28, and 31. As shown in FIG. 17, a second detectability determination unit is not used in the fifth embodiment, but is illustrated in FIGS. 21A to 21D for descriptive purposes.

Focusing on the first detectability determination signal flag_1, the first detectability determination signal flag_1 shifts to 0 in the vicinity of a voltage phase angle θv of 60+120×x (x: 0, 1, 2) degrees. Focusing on the second detectability determination signal flag_2, the second detectability determination signal flag_2 shifts to 0 in the vicinity of a voltage phase angle θv of 90+120×x (x: 0, 1, 2) degrees. Hence, the voltage phase angles θv at which the first detectability determination signal flag_1 and the second detectability determination signal flag_2 shift to 0 deviate from each other by 30 degrees, and therefore, when flag_1 is at 0, flag_2 is at 1, and conversely when flag_1 is at 1, flag_2 is at 0.

Figure 22:
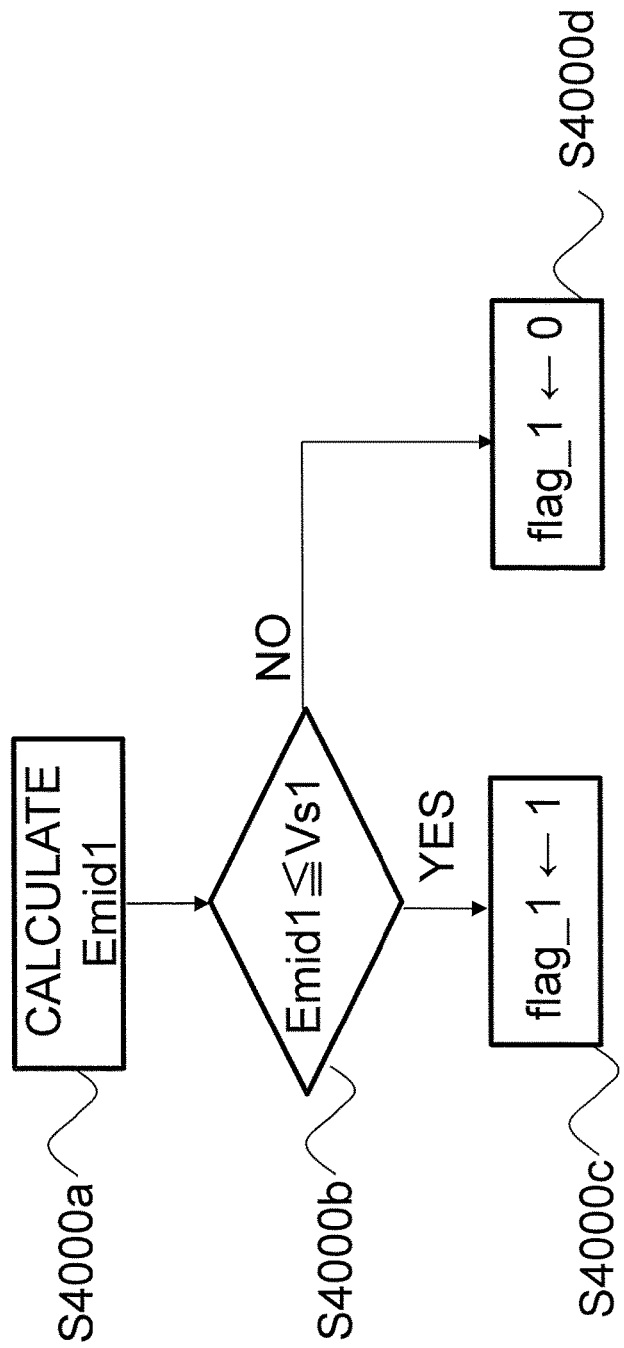
FIG. 22 is a flowchart showing a series of operations performed by the first detectability determination unit according to the fifth embodiment of this invention.

FIG. 22 is a flowchart showing a series of operations performed by the first detectability determination unit 12e according to the fifth embodiment of this invention. In step S4000a, the first detectability determination unit 12e calculates the first intermediate phase voltage Emid1 on the basis of the first voltage commands Vu1', Vv1', Vw1'. In step S4000b, the first detectability determination unit 12e determines whether or not the first intermediate phase voltage Emid1 is equal to or smaller than the first predetermined value Vs1. When "YES" is obtained, the routine advances to step S4000c, and when "NO" is obtained, the routine advances to step S4000d.

In a case where the routine advances to step S4000c, the first detectability determination unit 12e inserts 1 into the first detectability determination signal flag_1. In a case where the routine advances to step S4000d, on the other hand, the first detectability determination unit 12e inserts 0 into the first detectability determination signal flag_1.

Finally, when the first detectability determination signal flag_1 is at 1, the first detectability determination unit 12e determines that the currents of the first windings are detectable, and therefore switches the switch 7a so that the currents Id1, Iq1 on two rotational axes, determined from the first winding currents, are output respectively as Id', Iq'. When the first detectability determination signal flag_1 is at 0, on the other hand, the first detectability determination unit 12e determines that the currents of the first windings are undetectable, and therefore switches the switch 7a so that the currents Id2, Iq2 on two rotational axes, determined from the second winding currents, are output respectively as Id', Iq'.

According to the fifth embodiment, as described above, the currents of the first windings are detected on the basis of the currents flowing through the lower side arm elements of the respective phases of the first voltage application unit, and the currents of the second windings are detected on the basis of the currents flowing through the lower side arm elements of the respective phases of the second voltage application unit. Likewise with this configuration, identical effects to those of the first embodiment can be obtained.

Further, flag_1 indicates 0 when the voltage phase angle θv is in the vicinity of 60+120×x (x: 0, 1, 2) degrees. Therefore, by referring to the changes implemented in the third embodiment from the first embodiment, the detectability of the first windings can be determined on the basis of the voltage phase angle θv calculated from the first voltage commands likewise in a configuration where the first current detection unit detects the currents of the first windings on the basis of the currents flowing through the lower side arm elements of the respective phases of the first voltage application unit.

Moreover, by referring to the changes implemented in the fourth embodiment from the first embodiment, the detectability of the first windings can be determined on the basis of the voltage phase angle θv calculated from the second voltage commands likewise in a configuration where the first current detection unit detects the currents of the first windings on the basis of the currents flowing through the lower side arm elements of the respective phases of the first voltage application unit.

Furthermore, in the fifth embodiment, the first current detection unit detects the currents of the first windings on the basis of the currents flowing through the lower side arm elements of the respective phases of the first voltage application unit, while the second current detection unit detects the currents of the second windings on the basis of the currents flowing through the lower side arm elements of the respective phases of the second voltage application unit. Instead, however, this invention may be implemented with a similar configuration in which the first current detection unit detects the currents of the first windings on the basis of the currents flowing through the lower side arm elements of any two of the three phases of the first voltage application unit and the second current detection unit detects the currents of the second windings on the basis of the currents flowing through the lower side arm elements of any two of the three phases of the second voltage application unit.

Sixth Embodiment

Figure 23:
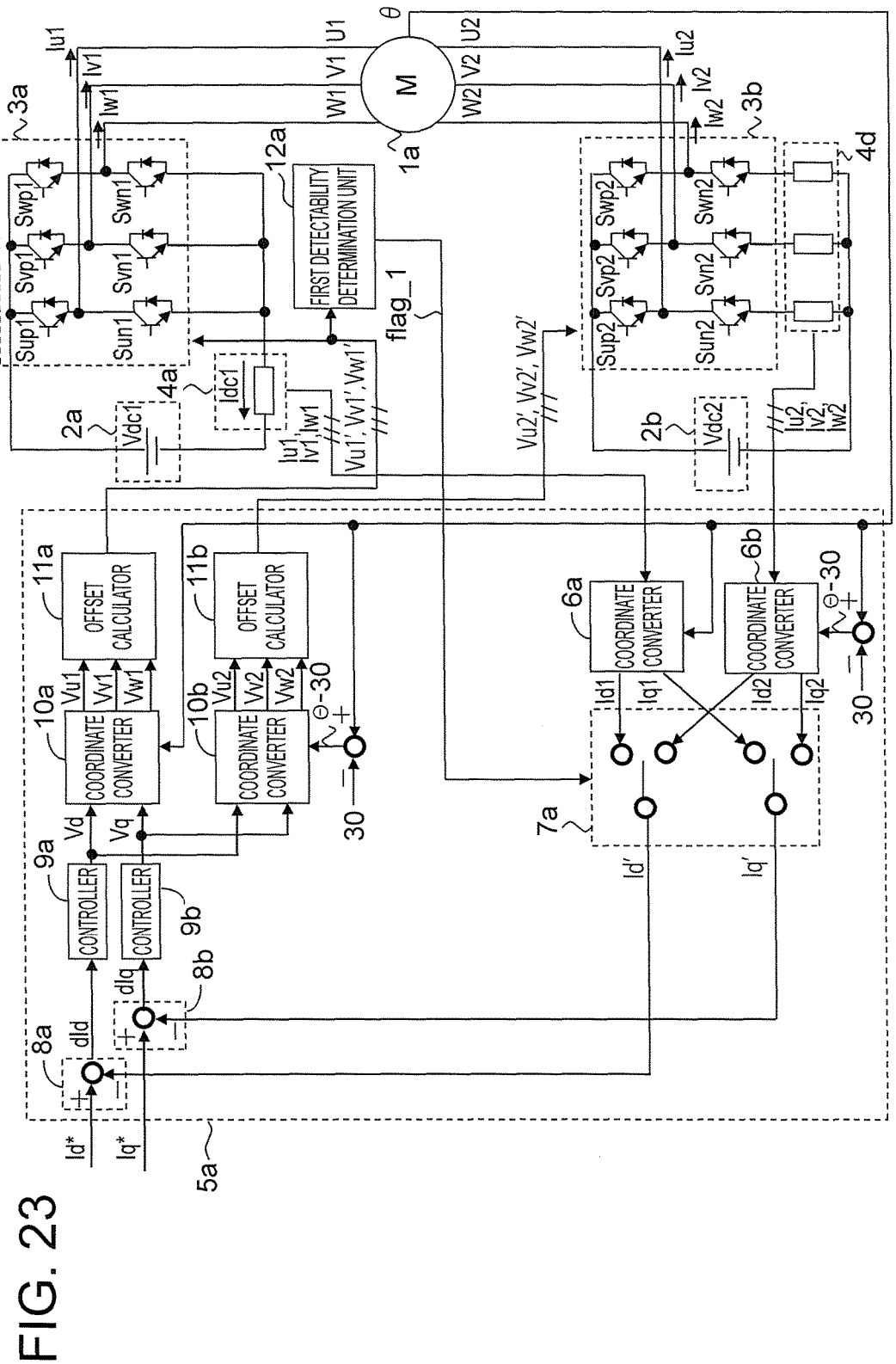
FIG. 23 is a view showing an overall configuration of a control apparatus for an AC rotary machine according to a sixth embodiment of this invention.

FIG. 23 is a view showing an overall configuration of a control apparatus for an AC rotary machine according to a sixth embodiment of this invention. The sixth embodiment differs from the first to fifth embodiments, described above, in that the first current detection unit 4a is used to detect the currents of the first windings and a second current detection unit 4d is used to detect the currents of the second windings. Accordingly, the following description centers on this difference.

In the sixth embodiment, the first voltage application unit 3a generates the ON/OFF patterns indicated by Sup1, Svp1, Swp1 in FIG. 9, as described in the first embodiment, while the second voltage application unit 3b generates the ON/OFF patterns indicated by Sup2, Svp2, Swp2 in FIG. 20, as described in the fifth embodiment.

As shown in FIGS. 12A to 12D of the first embodiment, when the currents Iu1, Iv1, Iw1 of the first windings are detected on the basis of the current flowing through the DC bus line of the first voltage application unit 3a, which is detected by the first current detection unit 4a, flag_1 is set at 0 in the vicinity of a voltage phase angle θv of 60×x (x: 0, 1, 2, 3, 4, 5, 6) degrees, and in this case, the currents of the first windings cannot be detected.

Further, as shown in FIGS. 21A to 21D of the fifth embodiment, when the currents Iu2, Iv2, Iw2 of the second windings are detected on the basis of the currents flowing through the lower arm elements of the second voltage application unit 3b, which are detected by the second current detection unit 4d, flag_2 is set at 0 in the vicinity of a voltage phase angle θv of 90+120×x (x: 0, 1, 2) degrees, and in this case, the currents of the second windings cannot be detected.

Hence, even when a configuration such as that shown in FIG. 23 is employed, flag_1 and flag_2 do not shift to 0 simultaneously, and at least one of flag_1 and flag_2 is set at 1. Therefore, likewise with the configuration of the sixth embodiment, similarly to the first to fifth embodiments, the first voltage commands and second voltage commands can be calculated on the basis of the currents Iu1, Iv1, Iw1 of the first windings when flag_1 is at 1 (i.e. when the currents of the first windings are detectable), and the first voltage commands and second voltage commands can be calculated on the basis of the currents Iu2, Iv2, Iw2 of the second windings when flag_1 is at 0 (i.e. when the currents of the first windings are undetectable).

According to the sixth embodiment, as described above, the first current detection unit detects the currents of the first windings on the basis of the current flowing through the DC bus line of the first voltage application unit, while the second current detection unit detects the currents of the second windings on the basis of the currents flowing through the lower arm elements of the respective phases of the second voltage application unit. With this configuration, identical effects to those of the first to fifth embodiments can be obtained.

Seventh Embodiment

Figure 24:
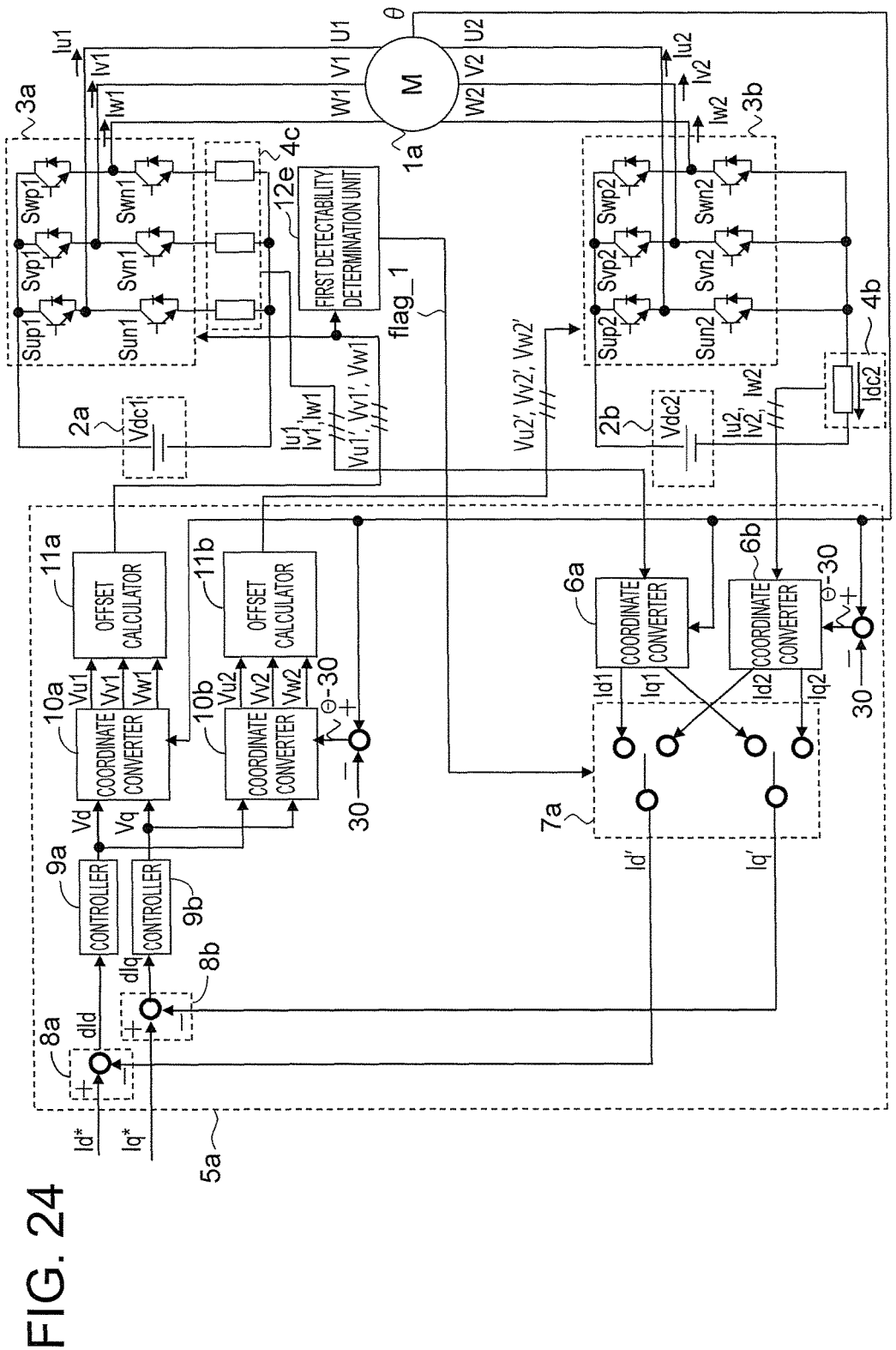
FIG. 24 is a view showing an overall configuration of a control apparatus for an AC rotary machine according to a seventh embodiment of this invention.

FIG. 24 is a view showing an overall configuration of a control apparatus for an AC rotary machine according to a seventh embodiment of this invention. The seventh embodiment differs from the first to sixth embodiments in that a first current detection unit 4c is used to detect the currents of the first windings and the second current detection unit 4b is used to detect the currents of the second windings. Accordingly, the following description centers on this difference.

In the seventh embodiment, the first voltage application unit 3a generates the ON/OFF patterns indicated by Sup1, Svp1, Swp1 in FIG. 20, as described in the fifth embodiment, while the second voltage application unit 3b generates the ON/OFF patterns indicated by Sup2, Svp2, Swp2 in FIG. 9, as described in the first embodiment.

As shown in FIGS. 21A to 21D of the fifth embodiment, when the currents Iu1, Iv1, Iw1 of the first windings are detected on the basis of the currents flowing through the lower arm elements of the respective phases of the first voltage application unit 3a, which are detected by the first current detection unit 4c, flag_1 is set at 0 in the vicinity of a voltage phase angle θv of 60+120×x (x: 0, 1, 2) degrees, and in this case, the currents of the first windings cannot be detected.

Further, as shown in FIGS. 12A to 12D of the first embodiment, when the currents Iu2, Iv2, Iw2 of the second windings are detected on the basis of the current flowing through the DC bus line of the second voltage application unit 3b, which is detected by the second current detection unit 4b, flag_2 is set at 0 in the vicinity of a voltage phase angle θv of 30+60×x (x: 0, 1, 2, 3, 4, 5) degrees, and in this case, the currents of the second windings cannot be detected.

Hence, even when a configuration such as that shown in FIG. 24 is employed, flag_1 and flag_2 do not shift to 0 simultaneously, and at least one of flag_1 and flag_2 is set at 1. Therefore, likewise with the configuration of the seventh embodiment, similarly to the first to fifth embodiments, the first voltage commands and second voltage commands can be calculated on the basis of the currents Iu1, Iv1, Iw1 of the first windings when flag_1 is at 1 (i.e. when the currents of the first windings are detectable), and the first voltage commands and second voltage commands can be calculated on the basis of the currents Iu2, Iv2, Iw2 of the second windings when flag_1 is at 0 (i.e. when the currents of the first windings are undetectable).

According to the seventh embodiment, as described above, the first current detection unit detects the currents of the first windings on the basis of the currents flowing through the lower arm elements of the respective phases of the first voltage application unit, while the second current detection unit detects the currents of the second windings on the basis of the current flowing through the DC bus line of the second voltage application unit. With this configuration, identical effects to those of the first to sixth embodiments can be obtained.

Eighth Embodiment

Figure 25:
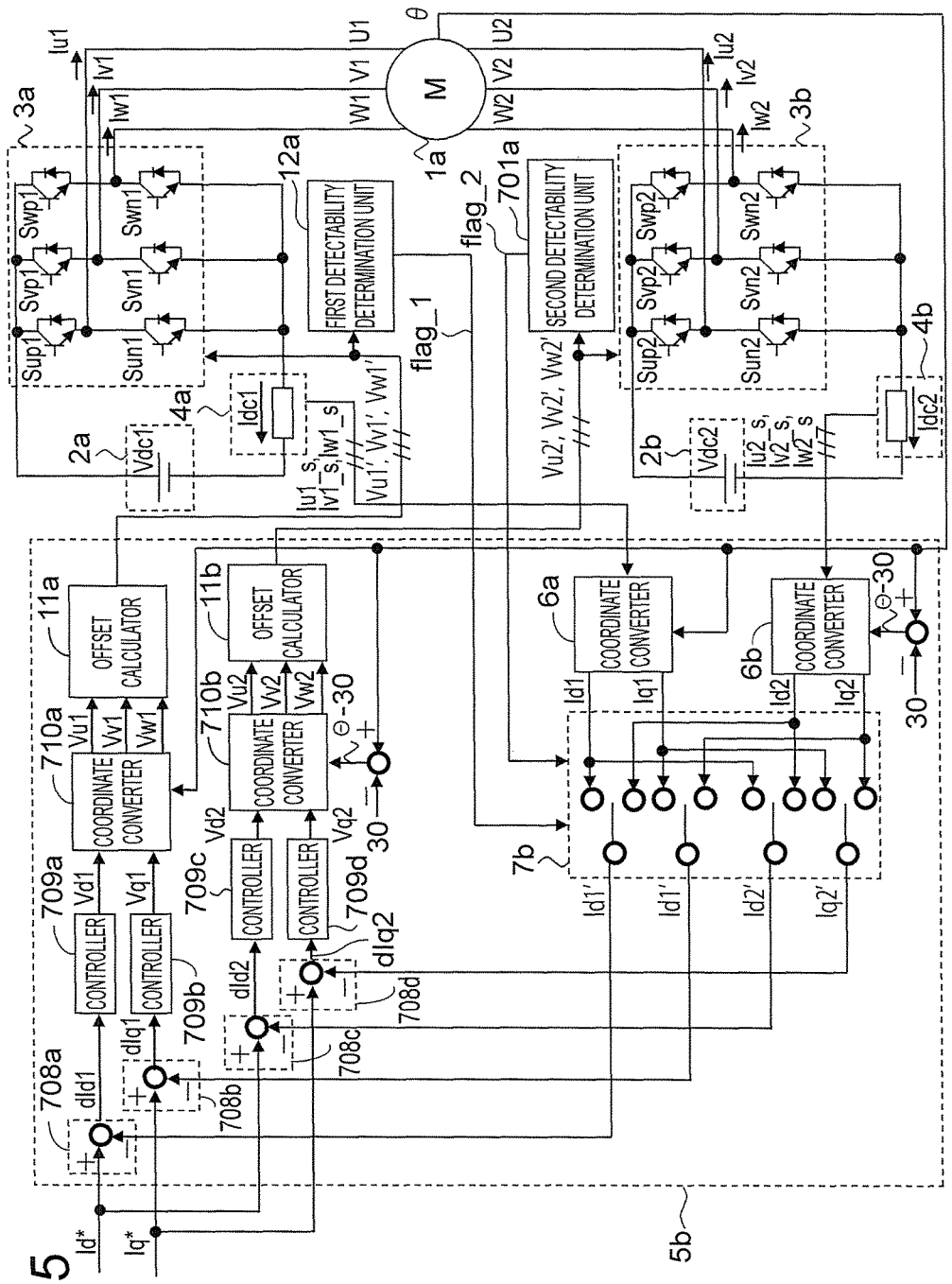
FIG. 25 is a view showing an overall configuration of a control apparatus for an AC rotary machine according to an eighth embodiment of this invention.

FIG. 25 is a view showing an overall configuration of a control apparatus for an AC rotary machine according to an eighth embodiment of this invention. The configuration of the eighth embodiment differs from that of the first embodiment in further including the second detectability determination unit 701a, and in an internal configuration of a control unit 5b. Accordingly, the following description centers on these differences.

The second detectability determination unit 701a outputs the second detectability determination signal flag_2 for determining whether or not the currents of the second windings are detectable on the basis of the second voltage commands Vu2', Vv2', Vw2'.

Next, changes implemented on the control unit 5b according to the eighth embodiment from the control unit 5a according to the first embodiment will be described. A switch 7b according to the eighth embodiment switches selectively between currents Id1', Iq1' on two rotational axes and currents Id2', Iq2' on two rotational axes, among the currents Id1, Iq1 of the first windings and the currents Id2, Iq2 of the second windings, on the basis of the first detectability determination signal flag_1 and the second detectability determination signal flag_2, and outputs the selected currents.

A subtractor 708a calculates a deviation dId1 between a d axis current command Id* of the AC rotary machine 1a and the current Id1' on two rotational axes, output by the switch 7b.

A subtractor 708b calculates a deviation dIq1 between a q axis current command Iq* of the AC rotary machine 1a and the current Iq1' on two rotational axes, output by the switch 7b.

A subtractor 708c calculates a deviation dId2 between the d axis current command Id* of the AC rotary machine 1a and the current Id2' on two rotational axes, output by the switch 7b.

A subtractor 708d calculates a deviation dIq2 between the q axis current command Iq* of the AC rotary machine 1a and the current Iq2' on two rotational axes, output by the switch 7b.

A controller 709a calculates a first voltage command Vd1 for controlling the deviation dId1 to zero using a P controller, a PI controller, and so on.

A controller 709b calculates a first voltage command Vq1 for controlling the deviation dIq1 to zero using a P controller, a PI controller, and so on.

A controller 709c calculates a second voltage command Vd2 for controlling the deviation dId2 to zero using a P controller, a PI controller, and so on.

A controller 709d calculates a second voltage command Vq2 for controlling the deviation dIq2 to zero using a P controller, a PI controller, and so on.

A coordinate converter 710a calculates the first voltage commands Vu1, Vv1, Vw1 by performing coordinate conversion to convert the first voltage commands Vd1, Vq1 to three-phase AC coordinates on the basis of the first voltage commands Vd1, Vq1 and the rotation position θ of the AC rotary machine 1a.

A coordinate converter 710b calculates the second voltage commands Vu2, Vv2, Vw2 by performing coordinate conversion to convert the second voltage commands Vd2, Vq2 to three-phase AC coordinates on the basis of the second voltage commands Vd2, Vq2 and the position θ−30, which is obtained by subtracting 30 degrees from the rotation position θ of the AC rotary machine 1a.

In a case where the second current detection unit 4b detects the currents of the second windings on the basis of the current flowing through the DC bus line of the second voltage application unit 3b, as in the first embodiment, the currents of the second windings are detectable when the second intermediate phase voltage Emid2 is no higher than the first threshold Vs1 and no lower than the second threshold Vs2, and undetectable when the second intermediate phase voltage Emid2 exceeds the first threshold Vs1 or is lower than the second threshold Vs2.

Figure 26:
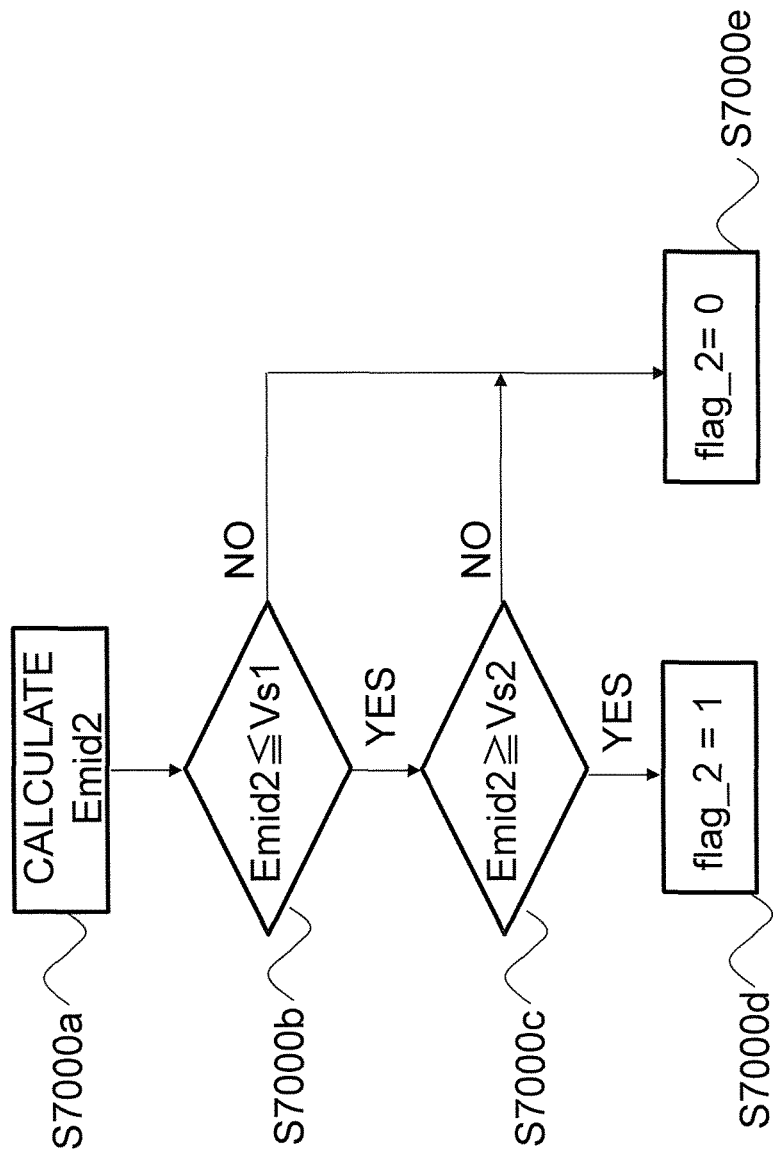
FIG. 26 is a flowchart showing a series of operations performed by a second detectability determination unit according to the eighth embodiment of this invention.

A function of the second detectability determination unit 701a newly added in the eighth embodiment will now be described on the basis of the above description. FIG. 26 is a flowchart showing a series of operations performed by the second detectability determination unit 701a according to the eighth embodiment of this invention. In step S7000a, the second detectability determination unit 701a calculates the second intermediate phase voltage Emid2 on the basis of the second voltage commands Vu2', Vv2', Vw2'.

In step S7000b, the second detectability determination unit 701a determines whether or not the second intermediate phase voltage Emid2 is equal to or lower than the first predetermined value Vs1. When "YES" is obtained, the routine advances to step S7000c, and when "NO" is obtained, the routine advances to step S7000e.

In step S7000c, the second detectability determination unit 701a determines whether or not the second intermediate phase voltage Emid2 equals or exceeds the second predetermined value Vs2. When "YES" is obtained, the routine advances to step S7000d, and when "NO" is obtained, the routine advances to step S7000e. In a case where the routine advances to step S7000d, the second detectability determination unit 701a inserts 1 into the second detectability determination signal flag_2. In a case where the routine advances to step S7000e, the second detectability determination unit 701a inserts 0 into the second detectability determination signal flag_2.

Figure 27:
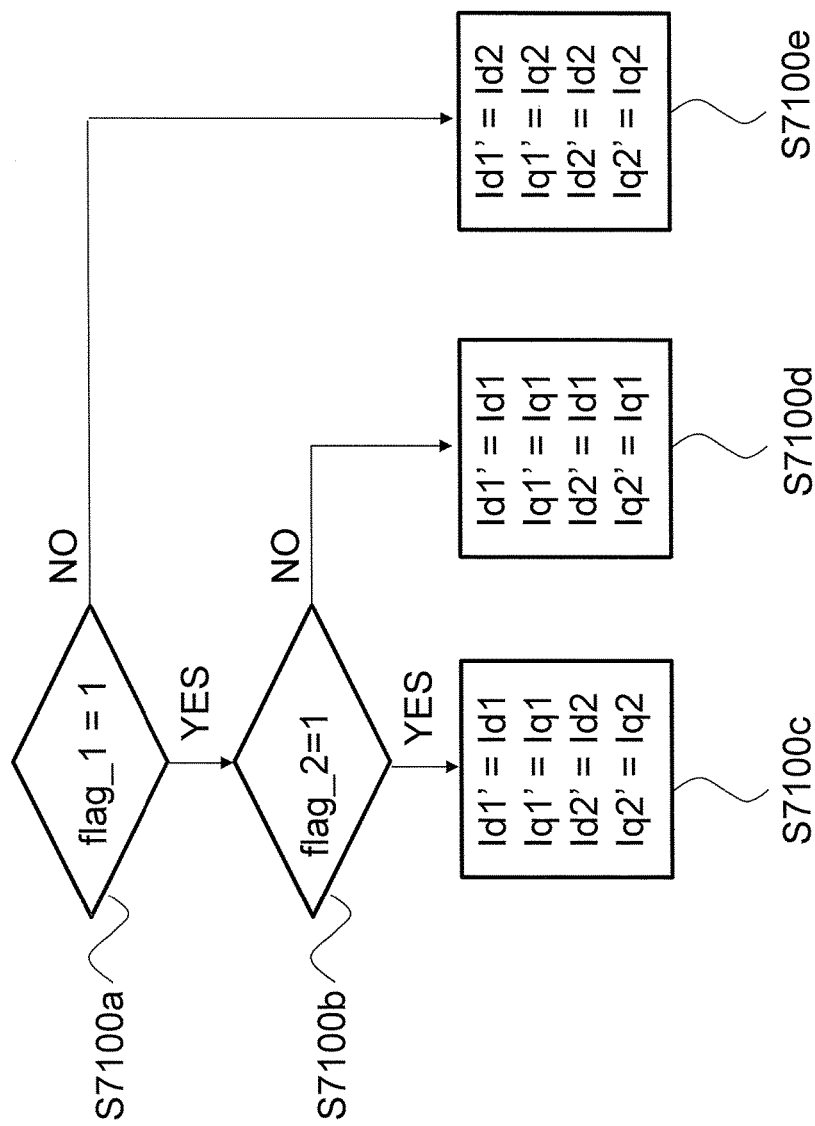
FIG. 27 is a flowchart showing a series of operations performed by a switch according to the eighth embodiment of this invention.

Next, operations of the switch 7b will be described using FIG. 27. FIG. 27 is a flowchart showing a series of operations performed by the switch 7b according to the eighth embodiment of this invention. Switching operations are performed by the switch 7b in steps S7100c, S7100d, and S7100e in accordance with the determination result obtained in step S7100a as to whether or not the first detectability determination signal flag_1 is equal to 1 and the determination result obtained in step S7100b as to whether or not the second detectability determination signal flag_2 is equal to 1.

When flag_1 is equal to 1 and flag_2 is equal to 1, the routine advances to step S7100c, where the currents Id1, Iq1 of the first windings are selected as Id1', Iq1' and the currents Id2, Iq2 of the second windings are selected as Id2', Iq2'. The selected currents are then output.

When flag_1 is equal to 1 but flag_2 is not equal to 1, the routine advances to step S7100d, where the currents Id1, Iq1 of the first windings are selected as Id1', Iq1' and the currents Id1, Iq1 of the first windings are also selected as Id2', Iq2'. The selected currents are then output.

When flag_1 is not equal to 1, the routine advances to step S7100e, where the currents Id2, Iq2 of the second windings are selected as Id1', Iq1' and the currents Id2, Iq2 of the second windings are also selected as Id2', Iq2', regardless of the value of flag_2. The selected currents are then output.

In the eighth embodiment, the first voltage commands Vd1, Vq1 are determined by the subtractors 708a, 708b and the controllers 709a, 709b using the current commands Id*, Iq* and Id1', Iq1'. As a result, the first voltage commands Vd1, Vq1 are calculated on the basis of Id1', Iq1'.

Further, the second voltage commands Vd2, Vq2 are determined by the subtractors 708c, 708d and the controllers 709c, 709d using the current commands Id*, Iq* and Id2', Iq2'. As a result, the second voltage commands Vd2, Vq2 are calculated on the basis of Id2', Iq2'.

When the first detectability determination unit 12a determines that the currents of the first windings are detectable and the second detectability determination unit 701a determines that the currents of the second windings are detectable (i.e. when the routine advances to step S7100c), the switch 7b switches the currents Id1, Iq1 of the first windings to Id1', Iq1', respectively, and switches the currents Id2, Iq2 of the second windings to Id2', Iq2', respectively, and then outputs the switched currents. Hence, in this case, the first voltage commands are calculated on the basis of the currents of the first windings and the second voltage commands are calculated on the basis of the currents of the second windings.

Further, when the first detectability determination unit 12a determines that the currents of the first windings are undetectable (i.e. when the routine advances to step S7100e), the switch 7b switches the currents Id2, Iq2 of the second windings to Id1', Iq1', respectively, and also switches the currents Id2, Iq2 of the second windings to Id2', Iq2', respectively, and then outputs the switched currents. Hence, in this case, the first voltage commands and the second voltage commands are calculated on the basis of the currents of the second windings.

Furthermore, when the first detectability determination unit 12a determines that the currents of the first windings are detectable but the second detectability determination unit 701a determines that the currents of the second windings are undetectable (i.e. when the routine advances to step S7100d), the switch 7b switches the currents Id1, Iq1 of the first windings to Id1', Iq1', respectively, and also switches the currents Id1, Iq1 of the first windings to Id2', Iq2', respectively, and then outputs the switched currents. Hence, in this case, the first voltage commands and the second voltage commands are calculated on the basis of the currents of the first windings.

In the first to seventh embodiments, when the currents of the first windings are undetectable, the first voltage commands and second voltage commands are calculated using the currents of the second windings. In this case, as shown in FIG. 12B, the currents of the first windings are undetectable (flag_1=0) only in a section where the voltage phase angle θv is in the vicinity of 60×x (x: 0, 1, 2, 3, 4, 5) degrees, and therefore a section in which the currents of the second windings are used is small.

In the eighth embodiment, on the other hand, the second detectability determination unit 701a is provided in addition to the first detectability determination unit 12a, and therefore the second voltage commands can be calculated on the basis of the currents of the second windings when flag_2 is at 1, as shown in FIG. 12D. Hence, in addition to the effects of the first to seventh embodiments, the controllability of the currents of the second windings can be improved, enabling further reductions in torque ripple, vibration, and noise from the AC rotary machine 1a.

Moreover, by referring to the second embodiment, a method of calculating the difference between the second maximum phase voltage and the second intermediate phase voltage and the difference between the second intermediate phase voltage and the second minimum phase voltage, and determining that the currents of the second windings are undetectable when the respective values thereof are smaller than the third predetermined value, may be employed as the method used by the second detectability determination unit 701a to determine the detectability of the currents of the second windings.

Further, by referring to the third and fourth embodiments so as to determine the detectability of the currents of the second windings by determining the voltage phase angle θv from at least one of the first voltage commands and the second voltage commands, identical effects to the first embodiment can be obtained.

Ninth Embodiment

Figure 28:
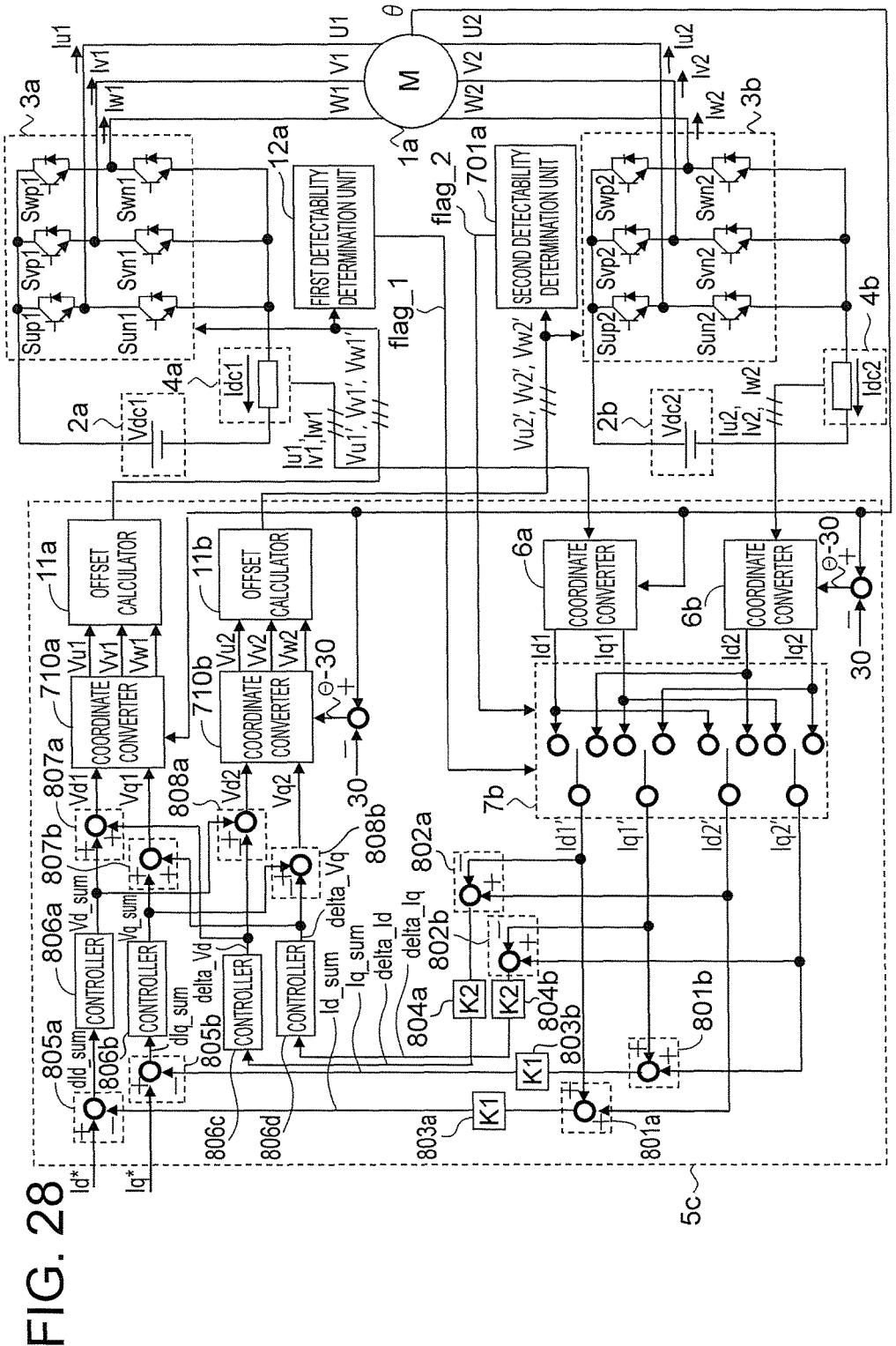
FIG. 28 is a view showing an overall configuration of a control apparatus for an AC rotary machine according to a ninth embodiment of this invention.

FIG. 28 is a view showing an overall configuration of a control apparatus for an AC rotary machine according to a ninth embodiment of this invention. A configuration of the ninth embodiment differs from the configuration of the eighth embodiment in that a control unit 5c is used in place of the control unit 5b, and the following description centers on this difference. Hence, the following description focuses on changes implemented on the control unit 5c from the control unit 5b.

An adder 801a outputs an added value (Id1'+Id2') obtained by adding together the current Id1' on two rotational axes and the current Id2' on two rotational axes.

An adder 801b outputs an added value (Iq1'+Iq2') obtained by adding together the current Iq1' on two rotational axes and the current Iq2' on two rotational axes.

A subtractor 802a outputs a value (Id1'−Id2') obtained by subtracting the current Id1' on two rotational axes from the current Id2' on two rotational axes.

A subtractor 802b outputs a value (Iq1'−Iq2') obtained by subtracting the current Iq1' on two rotational axes from the current Iq2' on two rotational axes.

A multiplier 803a multiplies the added value (Id1'+Id2') output by the adder 801a by K1, and outputs the result as a sum current Id_sum. Here, K1=0.5.

A multiplier 803b multiplies the added value (Iq1'+Iq2') output by the adder 801b by K1, and outputs the result as a sum current Iq_sum. Here, K1=0.5.

A multiplier 804a multiplies the subtracted value (Id1'−Id2') output by the subtractor 802a by K2, and outputs the result as a differential current delta_Id. Here, K2=0.5.

A multiplier 804b multiplies the subtracted value (Iq1'−Iq2') output by the subtractor 802b by K2, and outputs the result as a differential current delta_Iq. Here, K2=0.5.

A subtractor 805a calculates a deviation dId_sum between the d axis current command Id* of the AC rotary machine 1a and the sum current Id_sum.

A subtractor 805b calculates a deviation dIq_sum between the q axis current command Iq* of the AC rotary machine 1a and the sum current Iq_sum.

A controller 806a outputs a sum voltage Vd_sum at which the deviation dId_sum is controlled to zero using a P controller, a PI controller, and the like on the basis of a product of a proportional gain Kpd_sum of the used controllers and the deviation dId_sum.

A controller 806b outputs a sum voltage Vq_sum at which the deviation dIq_sum is controlled to zero using a P controller, a PI controller, and the like on the basis of a product of a proportional gain Kpq_sum of the used controllers and the deviation dIq_sum.

A controller 806c outputs a differential voltage delta_Vd at which the differential current delta_Id is controlled to zero using a P controller, a PI controller, and the like on the basis of a product of a proportional gain Kpd_delta of the used controllers and a deviation delta_dId.

A controller 806d outputs a differential voltage delta_Vq at which the differential current delta_Iq is controlled to zero using a P controller, a PI controller, and the like on the basis of a product of a proportional gain Kpq_delta of the used controllers and a deviation delta_dIq.

An adder 807a outputs a value obtained by adding together the sum voltage Vd_sum and the differential voltage delta_Vd as the first voltage command Vd1.

An adder 807b outputs a value obtained by adding together the sum voltage Vq_sum and the differential voltage delta_Vq as the first voltage command Vq1.

A subtractor 808a outputs a value obtained by subtracting the sum voltage Vd_sum from the differential voltage delta_Vd as the second voltage command Vd2.

A subtractor 808b outputs a value obtained by subtracting the sum voltage Vq_sum from the differential voltage delta_Vq as the second voltage command Vq2.

Next, the operations performed by the control unit 5c according to the ninth embodiment will be described in detail.

When the first detectability determination signal flag_1 and the second detectability determination signal flag_2 are both at 1 (in other words, when the currents of the first windings and the currents of the second windings are both determined to be detectable), the currents Id1', Iq1' on two rotational axes and the currents Id2', Iq2' on two rotational axes are equal to the currents Id1, Iq1 of the first windings and the currents Id2, Iq2 of the second windings, respectively.

Hence, the sum currents Id_sum, Iq_sum and the differential currents delta_Id, delta_Iq are as shown below in Equations (23) to (26), respectively.

$$Id\_sum = K1 \times (Id1' + Id2')$$

$$= K1 \times (Id1 + Id2) \quad (23)$$

$$Iq\_sum = K1 \times (Iq1' + Iq2')$$

$$= K1 \times (Iq1 + Iq2) \quad (24)$$

$$delta\_Id = K2 \times (Id1' - Id2')$$

$$= K2 \times (Id1 - Id2) \quad (25)$$

$$delta\_Iq = K2 \times (Iq1' - Iq2')$$

$$= K2 \times (Iq1 - Iq2) \quad (26)$$

Hence, the sum currents are expressed by the sum of the currents of the first windings, detected by the first current detection unit 4a, and the currents of the second windings, detected by the second current detection unit 4b, while the differential currents are expressed by the difference between the currents of the first windings, detected by the first current detection unit 4a, and the currents of the second windings, detected by the second current detection unit 4b.

The sum voltages Vd_sum, Vq_sum are calculated on the basis of the sum currents Id_sum, Iq_sum and a sum current gain, while the differential voltages delta_Vd, delta_Vq are calculated on the basis of the differential currents delta_Id, delta_Iq and a differential current gain. Further, the first current commands Vd1, Vq1 and the second current commands Vq1, Vq2 are calculated by the adders 807a, 807b and the subtractors 808a, 808b.

Here, the first three-phase windings U1, V1, W1 and the second three-phase windings U2, V2, W2 of the AC rotary machine 1a are joined to each other magnetically, but are not electrically connected. Hence, voltages that are proportionate to products of respective differential values of the currents of the first windings and a mutual inductance between the first windings and the second windings are generated in the second three-phase windings. Meanwhile, voltages that are proportionate to products of respective differential values of the currents of the second windings and the mutual inductance between the first windings and the second windings are generated in the first three-phase windings. In other words, the first windings and the second windings interfere with each other magnetically.

In the ninth embodiment, however, the first voltage commands Vd1, Vd2 and the second voltage commands Vq1, Vq2 are calculated on the basis of the sum currents and the differential currents. As a result, when the currents of the first windings and the currents of the second windings are both detectable, the voltage commands Vd1, Vq1 of the first windings are calculated in consideration of not only the currents of the first windings, detected by the first current detection unit 4a, but also the currents of the second windings, detected by the second current detection unit 4b.

Similarly, the second voltage commands Vd2, Vq2 are calculated in consideration of not only the currents of the second windings, detected by the second current detection unit 4b, but also the currents of the first windings, detected by the first current detection unit 4a. Therefore, by providing the configuration of the ninth embodiment, a more stable control system can be constructed with respect to magnetic interference between the first windings and the second windings.

When the first detectability determination signal flag_1 is at 0 and the second detectability determination signal flag_2 is at 1 (in other words, when the currents of the first windings are determined to be undetectable but the currents of the second windings are determined to be detectable), the currents Id1', Iq1' on two rotational axes are equal to the currents Id2, Iq2 of the second windings and the currents Id2', Iq2' on two rotational axes are also equal to the currents Id2, Iq2 of the second windings, as shown in FIG. 27.

Hence, the sum currents Id_sum, Iq_sum and the differential currents delta_Id, delta_Iq are as shown below in Equations (27) to (30), respectively.

$$Id\_sum = K1 \times (Id1' + Id2')$$

$$= K1 \times (2 \times Id2) \quad (27)$$

$$Iq\_sum = K1 \times (Iq1' + Iq2')$$

$$= K1 \times (2 \times Iq2) \quad (28)$$

$$delta\_Id = K2 \times (Id1' - Id2')$$

$$= 0 \quad (29)$$

$$delta\_Iq = K2 \times (Iq1' - Iq2')$$

$$= 0 \quad (30)$$

As shown in Equations (27) to (30), the sum currents are expressed by the currents of the second windings, detected by the second current detection unit 4b, while the differential currents are 0. Hence, the first voltage commands Vd1, Vq1 and the second voltage commands Vd2, Vq2 are calculated on the basis of the currents of the second windings and the sum current gain.

When the first detectability determination signal flag_1 is at 1 and the second detectability determination signal flag_2 is at 0 (in other words, when the currents of the first windings are determined to be detectable but the currents of the second windings are determined to be undetectable), the currents Id1', Iq1' on two rotational axes are equal to the currents Id1, Iq1 of the first windings and the currents Id2', Iq2' on two rotational axes are also equal to the currents Id1, Iq1 of the first windings, as shown in FIG. 27.

Hence, the sum currents Id_sum, Iq_sum and the differential currents delta_Id, delta_Iq are as shown below in Equations (31) to (34), respectively.

$$Id\_sum = K1 \times (Id1' + Id2')$$

$$= K1 \times (2 \times Id1) \quad (31)$$

$$Iq\_sum = K1 \times (Iq1' + Iq2')$$

$$= K1 \times (2 \times Iq1) \quad (32)$$

$$delta\_Id = K2 \times (Id1' - Id2')$$

$$= 0 \quad (33)$$

$$delta\_Iq = K2 \times (Iq1' - Iq2')$$

$$= 0 \quad (34)$$

As shown in Equations (31) to (34), the sum currents are expressed by the currents of the first windings, detected by the first current detection unit 4a, while the differential currents are 0. Hence, the first voltage commands Vd1, Vq1 and the second voltage commands Vd2, Vq2 are calculated on the basis of the currents of the first windings and the sum current gain.

Here, the differential currents are set at 0 in accordance with Equations (29) and (30) when the first detectability determination unit 12a outputs 0 as flag_1, and are set at 0 in accordance with Equations (33) and (34) when the second detectability determination unit 701a outputs 0 as flag_2. Accordingly, the differential voltages obtained by multiplying the differential voltage gain by the sum currents also equal zero. In this case, therefore, the differential voltages delta_Vd, delta_Vq may be set at 0, and the subtractors 802a, 802b, the multipliers 804a, 804b, and the controllers 806c, 806d that calculate the differential voltages from the differential currents may be omitted.

Further, by varying the differential current gains Kpd_delta, Kpq_delta on the basis of at least one of the first voltage commands, the second voltage commands, the sum voltage, and the rotation speed of the AC rotary machine 1a, pulsation in the differential voltages delta_Vd, delta_Vq caused by pulsation in the differential currents delta_Id, delta_Iq during switches in the first detectability determination signal flag_1 and the second detectability determination signal flag_2 from 0 to 1 and from 1 to 0 can be reduced.

Figure 29:
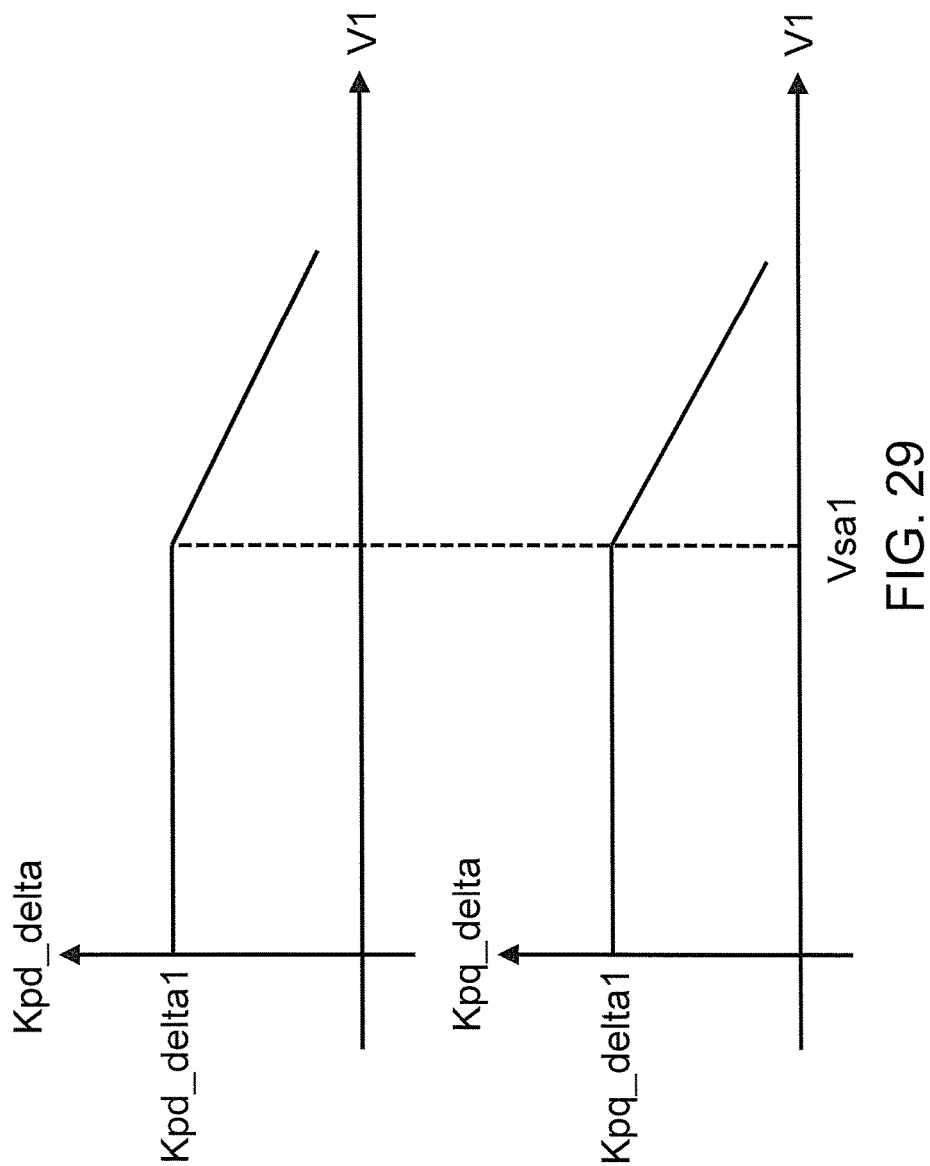
FIG. 29 is a view showing a condition in which differential current gains are varied on the basis of the first voltage commands, according to the ninth embodiment of this invention.

FIG. 29 is a view showing a condition in which the differential current gains are varied on the basis of the first voltage commands, according to the ninth embodiment of this invention. FIG. 29 shows an example of a case in which the differential current gains Kpd_delta, Kpq_delta are varied in accordance with an amplitude V1 of the first voltage commands. When the amplitude V1 of the first voltage commands is no higher than a threshold Vsa1, the differential current gains Kpd_delta, Kpq_delta are set respectively at fixed values Kpd_delta1, Kpq_delta1. When the amplitude V1 of the first voltage commands exceeds the threshold Vsa1, on the other hand, the differential current gains Kpd_delta, Kpq_delta are reduced along a straight line. The threshold Vsa1 and an incline of the straight line may be determined in accordance with a generated pulsation level. Here, the amplitude V1 of the first voltage commands may be determined using Equation (35), shown below.

[Math. 1]

$$V1 = \sqrt{2(V_{u1}^2 + V_{v1}^2 + V_{w1}^2)} = \sqrt{2(V_{d1}^2 + V_{q1}^2)} \quad (35)$$

Further, when a calculation load of a CPU that performs calculations as the control unit 5c increases due to calculating the square root in Equation (35), the abscissa of FIG. 29 may be set as the square of the amplitude. Furthermore, an amplitude V2 of the second voltage commands, which is given below in Equation (36), an amplitude V_sum of the sum voltage, which is given below in Equation (37), or a combination of V1, V2, and V_sum may be used as the abscissa of FIG. 29.

[Math. 4]

$$V2 = \sqrt{2(V_{u2}^2 + V_{v2}^2 + V_{w2}^2)} = \sqrt{2(V_{d2}^2 + V_{q2}^2)} \quad (36)$$

$$V\_sum = \sqrt{2(V_{dsum}^2 + V_{qsum}^2)} \quad (37)$$

By varying the sum current gains Kpd_sum, Kpq_sum on the basis of at least one of the first voltage commands, the second voltage commands, and the sum voltage, pulsation in the sum voltages Vd_sum, Vq_sum caused by pulsation in the sum currents Id_sum, Iq_sum during switches in the first detectability determination signal flag_1 and the second detectability determination signal flag_2 can be reduced.

Figure 30:
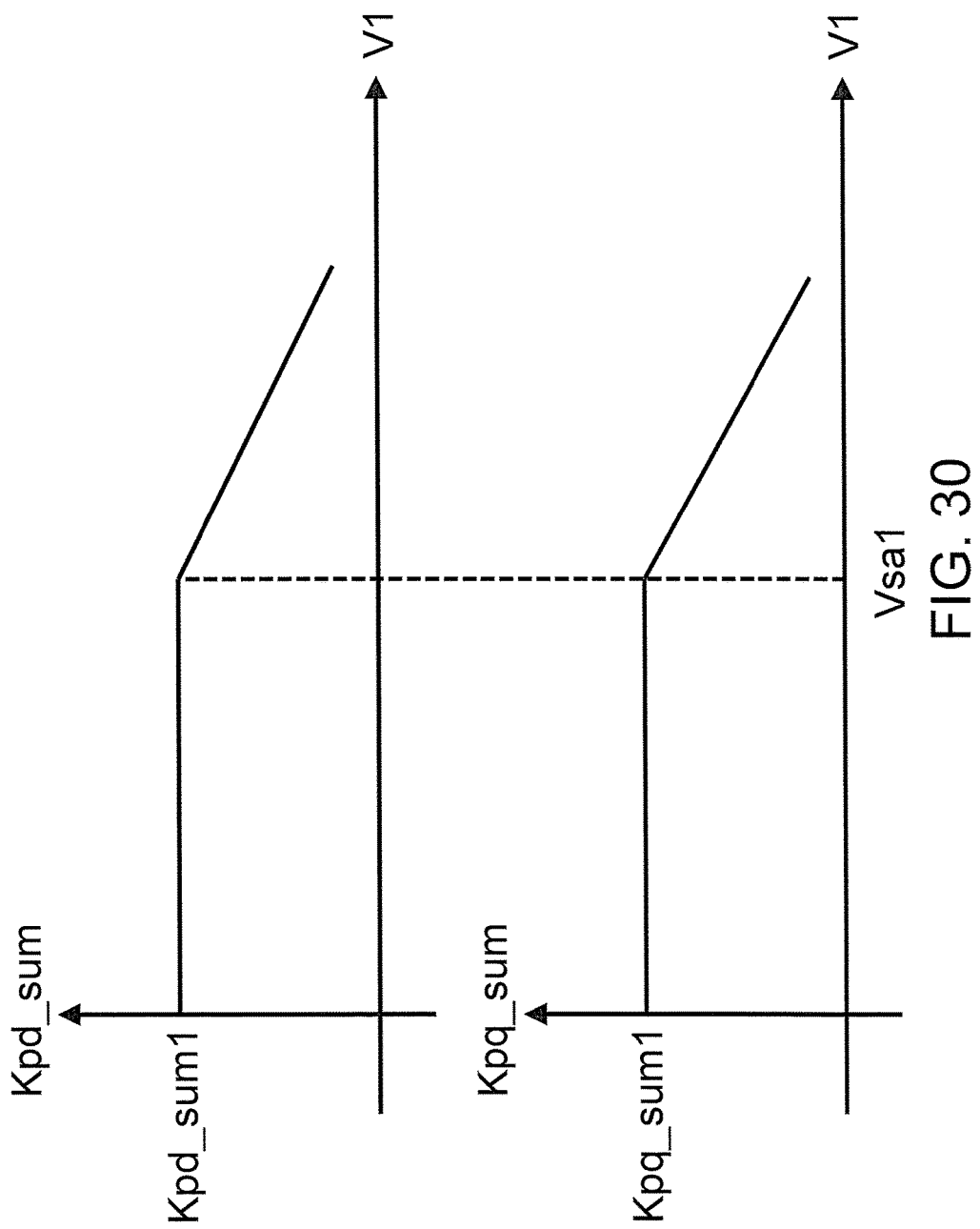
FIG. 30 is a view showing a condition in which sum current gains are varied on the basis of the first voltage commands, according to the ninth embodiment of this invention.

FIG. 30 is a view showing a condition in which the sum current gains are varied on the basis of the first voltage commands, according to the ninth embodiment of this invention. FIG. 30 shows an example of a case in which the sum current gains Kpd_sum, Kpq_sum are varied in accordance with the amplitude V1 of the first voltage commands. When the amplitude V1 of the first voltage commands is no higher than the threshold Vsa1, the sum current gains Kpd_sum, Kpq_sum are set respectively at fixed values Kpd_sum1, Kpq_sum1. When the amplitude V1 of the first voltage commands exceeds Vsa1, on the other hand, the sum current gains Kpd_sum, Kpq_sum are reduced along a straight line. The threshold Vsa1 and the incline of the straight line may be determined in accordance with the generated pulsation level.

Further, the amplitude V1 of the first voltage commands is used as the abscissa in FIG. 29, but the amplitude V2 of the second voltage commands, which is given above in Equation (36), the amplitude V_sum of the sum voltage, which is given above in Equation (37), or a combination of V1, V2, and V_sum may be used instead. Moreover, the gains may be switched in accordance with effective values rather than the amplitude of the first voltage commands, the second voltage commands, or the sum voltage.

Furthermore, similar effects are obtained with a configuration in which the abscissae of FIGS. 29 and 30 are set as the rotation speed of the AC rotary machine 1a such that the sum current gains and differential current gains are set at fixed values at or below a predetermined threshold relating to the speed and reduced in accordance with the speed above the predetermined threshold.

Tenth Embodiment

Figure 31:
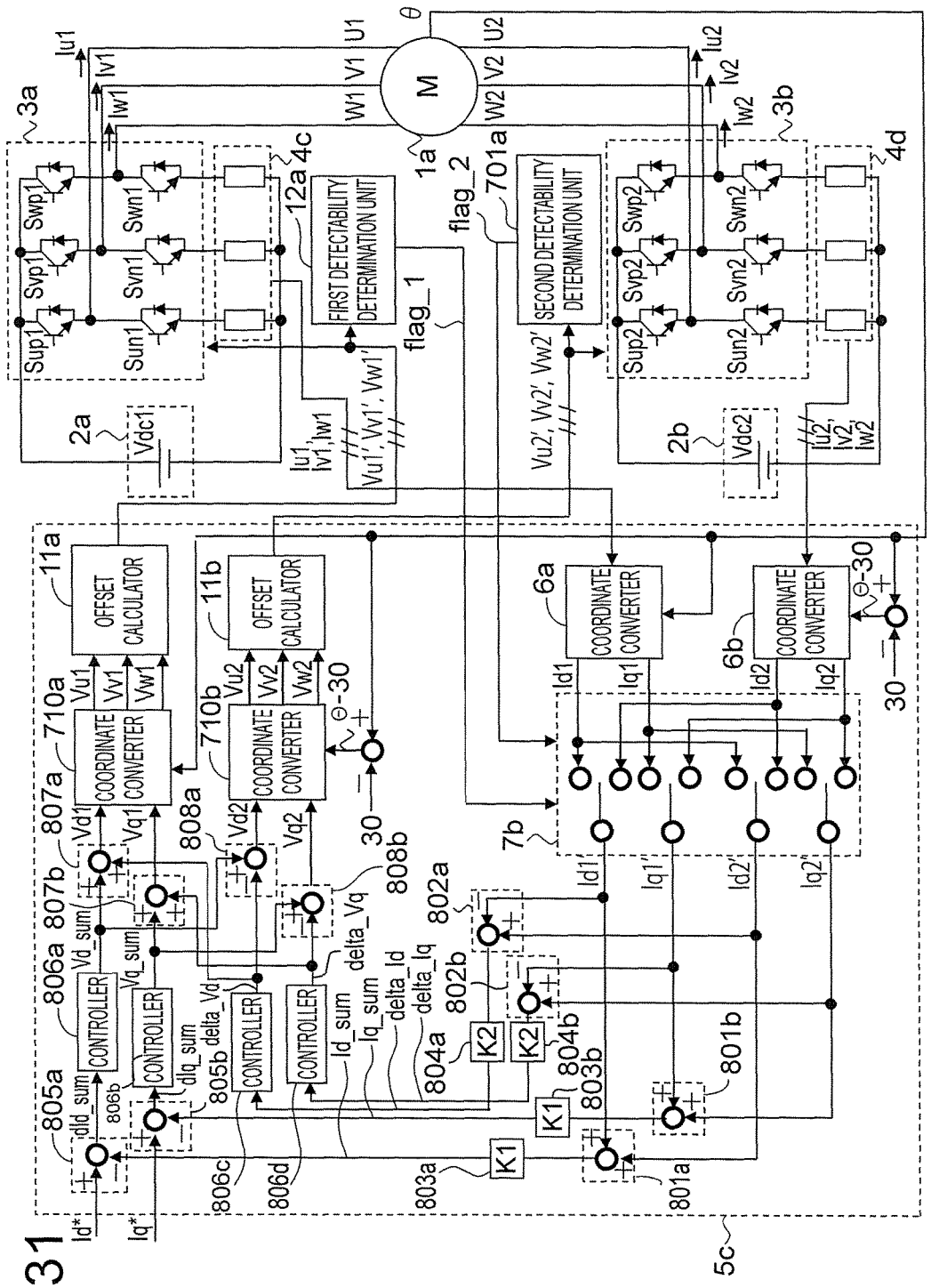
FIG. 31 is a view showing an overall configuration of a control apparatus for an AC rotary machine according to a tenth embodiment of this invention.

FIG. 31 is a view showing an overall configuration of a control apparatus for an AC rotary machine according to a tenth embodiment of this invention. A configuration of the tenth embodiment differs from the ninth embodiment in that the first current detection unit 4a is replaced with the first current detection unit 4c and the second current detection unit 4b is replaced with the second current detection unit 4d. Accordingly, the following description centers on these differences.

In the configuration of the ninth embodiment, shown in FIG. 28, the first current detection unit 4a and the second current detection unit 4b are used. Therefore, as shown in FIGS. 12A to 12D, the first current detection unit 4a is unable to detect the currents of the first windings in the vicinity of a voltage phase angle θv of 60×x (x: 0, 1, 2, 3, 4, 5) degrees, and the second current detection unit 4b is unable to detect the currents of the second windings in the vicinity of a voltage phase angle θv of 30+60×x (x: 0, 1, 2, 3, 4, 5) degrees.

In the tenth embodiment, however, the first current detection unit 4c and the second current detection unit 4d are used. Therefore, as shown in FIGS. 21A to 21D, the first current detection unit 4c becomes unable to detect the currents of the first windings in the vicinity of a voltage phase angle θv of 60+120×x (x: 0, 1, 2) degrees, and the second current detection unit 4d becomes unable to detect the currents of the second windings in the vicinity of a voltage phase angle θv of 90+120×x (x: 0, 1, 2) degrees. As a result, in the tenth embodiment, a voltage phase interval in which one of the first and second current detection units is unable to perform current detection can be reduced in comparison with the ninth embodiment.

Accordingly, a period in which the currents of the first windings and the currents of the second windings are both detectable is increased. As a result, a period in which the voltage commands Vd1, Vq1 of the first windings are calculated in consideration of the currents of the second windings, detected by the second current detection unit, in addition to the currents of the first windings, detected by the first current detection unit, is increased. Similarly, a period in which the second voltage commands Vd2, Vq2 are calculated in consideration of the currents of the first windings, detected by the first current detection unit, in addition to the currents of the second windings, detected by the second current detection unit, is increased. Therefore, an even more stable control system than that of the ninth embodiment can be constructed with respect to magnetic interference between the first windings and the second windings.

Note that in the first to tenth embodiments described above, an AC rotary machine including a first winding and a second winding was subjected to control. This invention is not limited to an AC rotary machine of this type, however, and the control method of this invention may be applied as is to an AC rotary machine having an Nth (where N is an integer no smaller than 3) winding indicating a third winding or more windings by substituting the first winding and the second to Nth windings respectively for the first and second windings described in the first to tenth embodiments.

Further, in the first to tenth embodiments described above, an AC rotary machine including first three-phase windings and second three-phase windings having a 30 degree phase difference was subjected to control. This invention is not limited to an AC rotary machine of this type, however, and by providing phase differences between the first voltage commands Vu1', Vv1', Vw1' and the second voltage commands Vu2', Vv2', Vw2', the control method of this invention may be applied to an AC rotary machine including first three-phase windings and second three-phase windings having a phase difference of 30+60×N (where N is an integer) degrees or an AC rotary machine including first three-phase windings and second three-phase windings not having a phase difference.

For example, when the phase difference is 30 degrees, the first voltage commands Vu1', Vv1', Vw1' and the second voltage commands Vu2', Vv2', Vw2' are similar to FIGS. 12A to 12D. As a result, the first detectability determination signal flag_1 and the second detectability determination signal flag_2 do not switch to 0 simultaneously, and therefore the control method of this invention can be applied.

Furthermore, the control apparatus for an AC rotary machine described in the first to tenth embodiments may be applied to control of an electric power steering having a control apparatus for an AC rotary machine. An electric power steering apparatus requires a control unit that calculates a first voltage command and a second voltage command to ensure that the AC rotary machine generates torque for assisting steering torque of a steering system.

By applying the control apparatus for an AC rotary machine according to this invention as a control unit for an electric power steering, the first voltage command and the second voltage command can be calculated at a high amplitude while maintaining a switching period Tsw. As a result, a steering system in which the switching frequency, which is given by the inverse of the switching period, is removed from the audible range such that increased output is obtained at an identical volume ratio while maintaining low noise can be constructed. In other words, the apparatus can be reduced in size while obtaining an identical output ratio, and therefore a steering system that is easy to install can be realized.

The invention claimed is:

1. A control apparatus for an AC rotary machine, characterized by comprising:
an AC rotary machine that includes a first winding and a second winding which have a phase difference;
a first current detection unit that detects a current of the first winding;
a second current detection unit that detects a current of the second winding;
a control unit that calculates a first voltage command and a second voltage command on the basis of a detected current value of the AC rotary machine;
a first voltage application unit that applies a voltage to the first winding on the basis of the first voltage command;
a second voltage application unit that applies a voltage to the second winding on the basis of the second voltage command; and
a first detectability determination unit that determines a detectability of the current of the first winding, detected by the first current detection unit, on the basis of at least one of the first voltage command and the second voltage command,
wherein the control unit calculates the first voltage command on the basis of the current of the first winding, detected by the first current detection unit, when the first detectability determination unit determines that the current of the first winding is detectable, and calculates the first voltage command and the second voltage command on the basis of the current of the second winding, detected by the second current detection unit, when the first detectability determination unit determines that the current of the first winding is undetectable.

2. A control apparatus for an AC rotary machine, characterized by comprising:
an AC rotary machine that includes a first winding and a second winding;
a first current detection unit that detects a current of the first winding;
a second current detection unit that detects a current of the second winding;
a control unit that calculates a first voltage command and a second voltage command which have a phase difference on the basis of a detected current value of the AC rotary machine;
a first voltage application unit that applies a voltage to the first winding on the basis of the first voltage command;
a second voltage application unit that applies a voltage to the second winding on the basis of the second voltage command; and
a first detectability determination unit that determines a detectability of the current of the first winding, detected by the first current detection unit, on the basis of at least one of the first voltage command and the second voltage command,
wherein the control unit calculates the first voltage command on the basis of the current of the first winding, detected by the first current detection unit, when the first detectability determination unit determines that the current of the first winding is detectable, and calculates the first voltage command and the second voltage command on the basis of the current of the second winding, detected by the second current detection unit, when the first detectability determination unit determines that the current of the first winding is undetectable.

3. The control apparatus for an AC rotary machine according to claim 1, wherein when a three-phase voltage constituting the first voltage command is set in descending order as a first maximum phase voltage, a first intermediate phase voltage, and a first minimum phase voltage, the first detectability determination unit determines whether or not the current of the first winding can be can be detected on the basis of a magnitude of the first intermediate phase voltage.

4. The control apparatus for an AC rotary machine according to claim 3, wherein when the first intermediate phase voltage exceeds a first predetermined value, the first detectability determination unit determines that the current of the first winding is undetectable.

5. The control apparatus for an AC rotary machine according to claim 3, wherein when the first intermediate phase voltage is lower than a second predetermined value, the first detectability determination unit determines that the current of the first winding is undetectable.

6. The control apparatus for an AC rotary machine according to claim 3, wherein when at least one of a difference between the first maximum phase voltage and the first intermediate phase voltage and a difference between the first intermediate phase voltage and the first minimum phase voltage is lower than a third predetermined value, the first detectability determination unit determines that the current of the first winding is undetectable.

7. The control apparatus for an AC rotary machine according to claim 1, wherein the first detectability determination unit determines whether or not the current of the first winding can be detected by the first current detection unit in accordance with a voltage phase angle of the first voltage command or a voltage phase angle of the second voltage command.

8. The control apparatus for an AC rotary machine according to claim 1, characterized by further comprising a second detectability determination unit that determines a detectability of the current of the second winding, detected by the second current detection unit, on the basis of at least one of the first voltage command and the second voltage command,
wherein, when the current of the first winding is determined to be detectable by the first detectability determination unit, the control unit calculates the first voltage command and the second voltage command on the basis of the current of the first winding, detected by the first current detection unit, in a case where the second detectability determination unit determines that the current of the second winding is undetectable, and
calculates the first voltage command on the basis of the current of the first winding, detected by the first current detection unit, and calculates the second voltage command on the basis of the current of the second winding, detected by the second current detection unit, in a case where the second detectability determination unit determines that the current of the second winding is detectable.

9. The control apparatus for an AC rotary machine according to claim 8, wherein when a three-phase voltage constituting the second voltage command is set in descending order as a second maximum phase voltage, a second intermediate phase voltage, and a second minimum phase voltage, the second detectability determination unit determines whether or not the current of the second winding can be detected on the basis of a magnitude of the second intermediate phase voltage.

10. The control apparatus for an AC rotary machine according to claim 9, wherein when the second intermediate phase voltage exceeds a first predetermined value, the second detectability determination unit determines that the current of the second winding is undetectable.

11. The control apparatus for an AC rotary machine according to claim 9, wherein when the second intermediate phase voltage is lower than the second predetermined value, the second detectability determination unit determines that the current of the second winding is undetectable.

12. The control apparatus for an AC rotary machine according to claim 9, wherein when at least one of a difference between the second maximum phase voltage and the second intermediate phase voltage and a difference between the second intermediate phase voltage and the second minimum phase voltage is lower than a third predetermined value, the second detectability determination unit determines that the current of the second winding is undetectable.

13. The control apparatus for an AC rotary machine according to claim 9, wherein the second detectability determination unit determines whether or not the current of the second winding can be detected by the second current detection unit in accordance with a voltage phase angle of the first voltage command or a voltage phase angle of the second voltage command.

14. The control apparatus for an AC rotary machine according to claim 8, wherein in a first case where the first detectability determination unit determines that the current of the first winding is detectable and the second detectability determination unit determines that the current of the second winding is detectable, the control unit calculates a sum voltage on the basis of a sum current, which is a sum of the current of the first winding detected by the first current detection unit and the current of the second winding detected by the second current detection unit, a current command, and a sum current gain, and calculates a differential voltage on the basis of a differential current, which is a difference between the current of the first winding detected by the first current detection unit and the current of the second winding detected by the second current detection unit, and a differential current gain,
in a second case where the first detectability determination unit determines that the current of the first winding is undetectable, the control unit calculates the sum voltage on the basis of the current of the second winding detected by the second current detection unit, the current command, and the sum current gain, and sets the differential current or the differential voltage at zero,
in a third case where the second detectability determination unit determines that the current of the second winding is undetectable, the control unit calculates the sum voltage on the basis of the current of the first winding detected by the first current detection unit, the current command, and the sum current gain, and sets the differential current or the differential voltage at zero, and
in each of the first case, the second case, and the third case, the control unit calculates the first voltage command and the second voltage command on the basis of the sum voltage and the differential voltage.

15. The control apparatus for an AC rotary machine according to claim 14, wherein the control unit modifies the differential current gain in accordance with at least one of the first voltage command, the second voltage command, the sum voltage, and a rotation speed of the AC rotary machine.

16. The control apparatus for an AC rotary machine according to claim 14, wherein the control unit modifies the sum current gain in accordance with at least one of the first voltage command, the second voltage command, the sum voltage, and a rotation speed of the AC rotary machine.

17. The control apparatus for an AC rotary machine according to claim 1, wherein the first current detection unit detects the current of the first winding on the basis of a current flowing through a DC bus line of the first voltage application unit, and the second current detection unit detects the current of the second winding on the basis of a current flowing through a DC bus line of the second voltage application unit.

18. The control apparatus for an AC rotary machine according to claim 1, wherein the first current detection unit detects the current of the first winding on the basis of a current flowing through a lower side arm element of the first voltage application unit, and the second current detection unit detects the current of the second winding on the basis of a current flowing through a lower side arm element of the second voltage application unit.

19. The control apparatus for an AC rotary machine according to claim 1 wherein the first current detection unit detects the current of the first winding on the basis of a current flowing through a DC bus line of the first voltage application unit, and the second current detection unit detects the current of the second winding on the basis of a current flowing through a lower side arm element of the second voltage application unit.

20. The control apparatus for an AC rotary machine according to claim 1, wherein the first current detection unit detects the current of the first winding on the basis of a current flowing through a lower side arm element of the first voltage application unit, and the second current detection unit detects the current of the second winding on the basis of a current flowing through a DC bus line of the second voltage application unit.

21. The control apparatus for an AC rotary machine according to claim 1, wherein the phase difference is 30±60×n (where n is an integer).

22. A control apparatus for an electric power steering, characterized by comprising the control apparatus for an AC rotary machine according to claim 1, wherein the control unit calculates the first voltage command and the second voltage command such that the AC rotary machine generates torque for assisting steering torque of a steering system.

* * * * *